United States Patent [19]
Fukazawa et al.

[11] Patent Number: 5,936,740
[45] Date of Patent: *Aug. 10, 1999

[54] SCANNER HEAD CARTRIDGE AND APPARATUS FOR PROCESSING INFORMATION CAPABLE OF MOUNTING SUCH SCANNER HEAD CARTRIDGE THEREON

[75] Inventors: Hideo Fukazawa, Chigasaki; Makoto Torigoe, Tokyo; Shoji Kikuchi, Yokohama; Shinya Asano, Tokyo; Yuichi Kaneko, Fukushima; Hiroyuki Tanaka, Kawasaki; Akihiko Nakatani, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/958,741

[22] Filed: Oct. 27, 1997

Related U.S. Application Data

[63] Continuation of application No. 08/711,653, Sep. 9, 1996, abandoned.

[30] Foreign Application Priority Data

Sep. 14, 1995 [JP] Japan .................................. 7-236726

[51] Int. Cl.$^6$ ........................... H04N 1/024; H04N 1/04; B41J 35/28
[52] U.S. Cl. ........................ 358/296; 347/263; 358/474; 359/17
[58] Field of Search ................................ 347/3, 49, 263, 347/245; 359/17; 358/296, 471, 474, 494

[56] References Cited

U.S. PATENT DOCUMENTS

| | | | |
|---|---|---|---|
| 4,525,748 | 6/1985 | Carbone | 358/286 |
| 4,896,166 | 1/1990 | Barker et al. | 346/76 PH |
| 5,051,759 | 9/1991 | Karita et al. | 346/140 R |
| 5,138,344 | 8/1992 | Ujita | 346/140 R |
| 5,619,237 | 4/1997 | Inoue et al. | 347/86 |
| 5,638,100 | 6/1997 | Kanematsu et al. | 347/35 |

FOREIGN PATENT DOCUMENTS

| | | |
|---|---|---|
| 0546832 | 6/1993 | European Pat. Off. . |
| 0641114 | 3/1995 | European Pat. Off. . |
| 0641115 | 3/1995 | European Pat. Off. . |
| 0642925 | 3/1995 | European Pat. Off. . |
| 59-099862 | 6/1984 | Japan . |
| 60-48383 | 3/1985 | Japan . |
| 60-204342 | 10/1985 | Japan . |

OTHER PUBLICATIONS

"Marks's Standard Handbook for Mechanical Engineers", title page, ch. 3, p. 4 (Baumeister, et al., eds., 1978).

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

A scanner head cartridge, which can be mounted exchangeably with an ink head cartridge on a carriage capable of moving the ink head cartridge of an information processing apparatus for recording on a recording medium, includes a lower case containing therein optical parts required for reading, an upper case structured to be coupled with the lower case for covering the open face of the lower case and guiding means arranged on the upper surface of the upper case for positioning when being inserted into the carriage. With the structure thus arranged, it is possible to mount the scanner head cartridge on the carriage by a simple mounting operation with a highly precise positioning simultaneously.

35 Claims, 16 Drawing Sheets

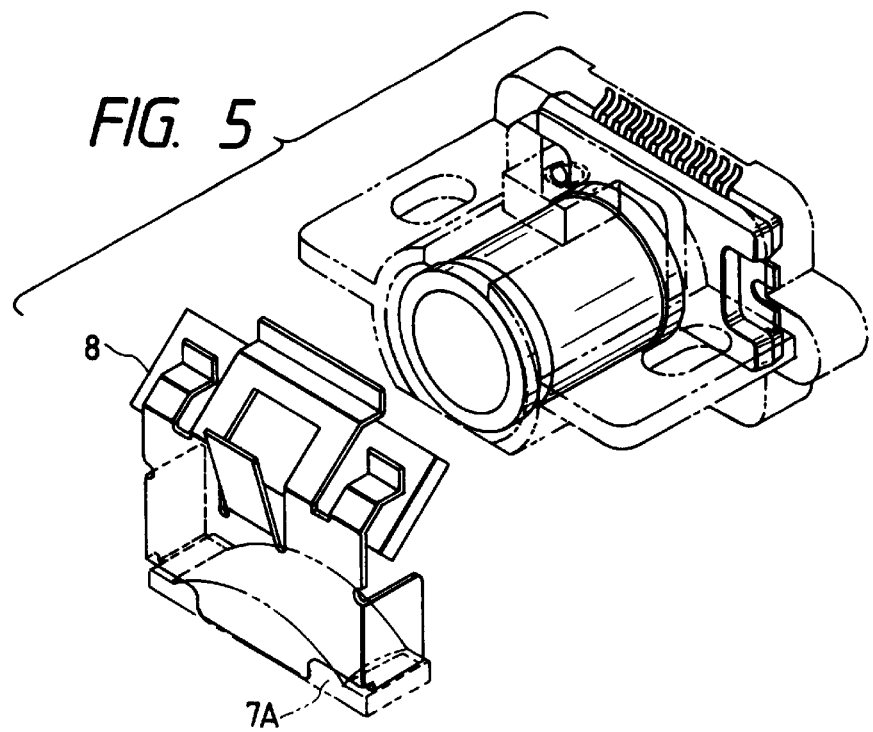
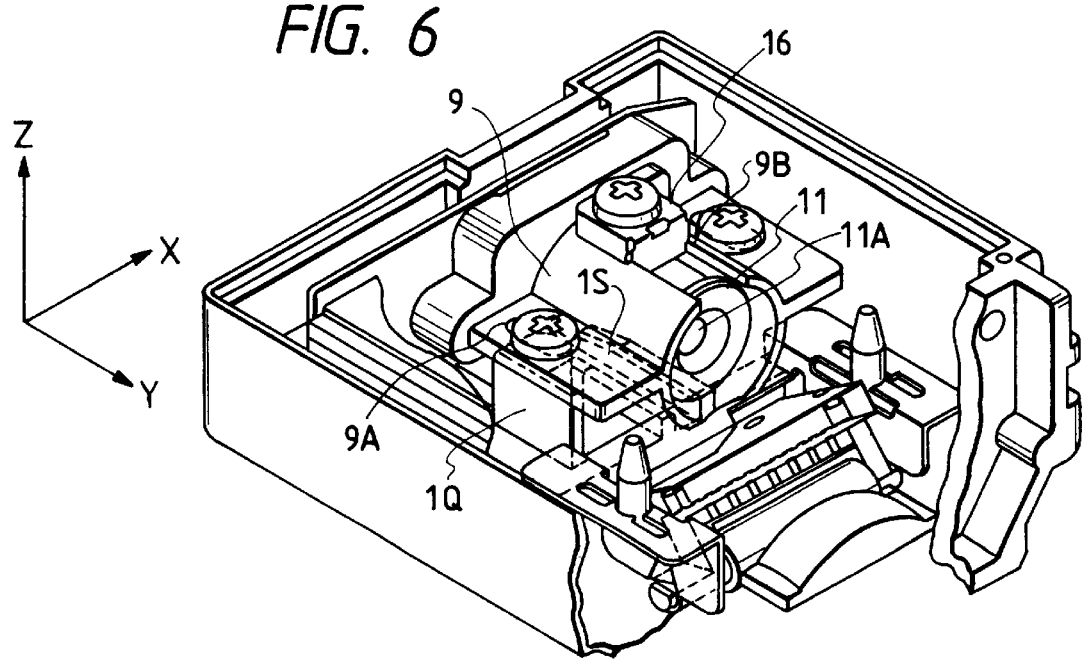

SCANNER HEAD CARTRIDGE AND APPARATUS FOR PROCESSING INFORMATION CAPABLE OF MOUNTING SUCH SCANNER HEAD CARTRIDGE THEREON

This application is a continuation of application Ser. No. 08/1711,653 filed Sep. 9, 1996, now abandoned.

BACKGROUND OF THE INVENTION

1. Field of the Invention

The present invention relates to a scanner head cartridge that enables a serial printer to function as a reading apparatus by detachably and exchangeably mounting such cartridge on and with recording means of the serial printer.

2. Related Background Art

For a printer having reading means, a structure has hitherto been adopted to exchange recording means held on a carriage with reading means. Generally, such structure is arranged to irradiate the surface of a source document by means of an illuminating device installed on a scanner head serving as reading means, and then, a sensor reads the reflected images of the source document through a lens.

However, the following problems are encountered in arranging the conventional structure that enables a printer to be able to function as a reading apparatus with recording means and reading means, which is exchangeably mountable on it:

(1) When a scanner head cartridge having an optical system incorporated therein is exchanged with recording means and mounted on a carriage, the scanner head cartridge should be positioned in mounting it on the carriage so that the reading surface of a recording medium is positioned optically at a given focal distance of the scanner head cartridge. Therefore, a positioning device to be provided for the scanner head cartridge should be able to define the gap between the scanner head cartridge and the recording medium in a precision higher than that of the gap between recording means and the recording medium. Also, at this juncture, the scanner head cartridge should be mounted on the carriage in such a manner so that the members (a transparent window, lens, and the like, for example), which are included in the optical path to guide the light that carries the read-out information to the interior of the scanner head cartridge, are protected from any possible damage that may be caused by collision with the parts of the carriage.

(2) In the case of an ink jet printer that includes an ink tank in recording means for recording by use of ink, the colors and amounts of ink retained in the ink tank are different depending on the usage of the printer. Therefore, the various modes are adopted for the carriage that mounts recording means on it. Particularly, along the rapid advancement of recording technologies in recent years, new printers and ink head cartridges are produced one after another. As a result, for the respective ink head cartridges whose configurations and mounting modes are different, many kinds of scanner head cartridges should be produced, leading to a problem of extremely high costs of manufacture.

Further, on the user side, it is necessary for him to purchase scanner head cartridges per printer if he owns several kinds of printers using different ink head cartridges, while he intends to use each of them as the one that can function as reading apparatuses.

SUMMARY OF THE INVENTION

The present invention is designed in consideration of the technical problems of the conventional art described above. It is an object of the invention to provide a scanner head cartridge capable of being mounted on a carriage easily with the performance of a highly precise positioning, and to provide an information processing apparatus that can mount such scanner head cartridge on it.

It is another object of the invention to provide a scanner head cartridge capable of being mounted on a carriage smoothly by a simple mounting operation of the scanner head cartridge, and to provide an information processing apparatus that can mount such scanner head cartridge on it.

It is still another object of the invention to provide a scanner head cartridge structured to be able to share its base unit even by carriages arranged to be configured to mount different ink head cartridges.

It is a further object of the invention to provide a scanner head cartridge structured to be able to easily adjust the focal distance and others of the optical system thereof, which is needed when it is used exchangeably with a recording head cartridge, and to provide an information processing apparatus that can mount such scanner head cartridge on it.

It is still a further object of the invention to provide a scanner head cartridge capable of being held exchangeably with an ink head cartridge on a carnage capable of moving the ink head cartridge of an information processing apparatus for recording on a recording medium, and the scanner head cartridge including the following:

a lower case containing therein optical parts required for reading;

an upper case structured to be coupled with the lower case for covering the open face of the lower case; and guiding means arranged on the upper surface of the upper case for positioning when being inserted into the carriage.

It is another object of the invention to provide an information processing apparatus for recording on a recording medium including a carriage capable of mounting a scanner head cartridge thereon and moving such cartridge along the recording medium exchangeably with an ink head cartridge for recording on the recording medium, here the scanner head cartridge being provided with a lower case containing in it optical parts required for reading, an upper case structured to couple with the lower case for covering the open face of the lower case, and guiding means arranged on the upper surface of the upper case for positioning when being inserted into the carriage.

Other objectives and advantages besides those discussed above will be apparent to those skilled in the art from the description of a preferred embodiment of the invention which follows. In the description, reference is made to accompany drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 5 is a view which shows the fixing method for the optical parts in accordance with the present embodiment.

FIG. 6 is a view which shows the lens adjustment unit in accordance with the present embodiment.

DETAILED DESCRIPTION OF THE PREFERRED EMBODIMENTS

Figure 1:
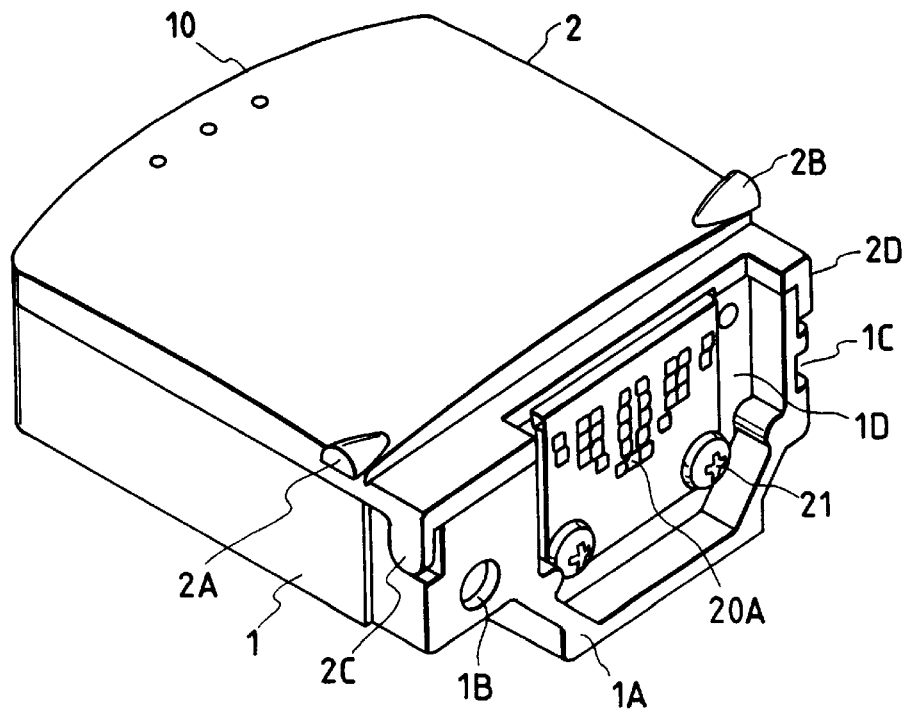
FIG. 1 is a perspective view which shows the outer appearance of the present embodiment.
Figure 2:
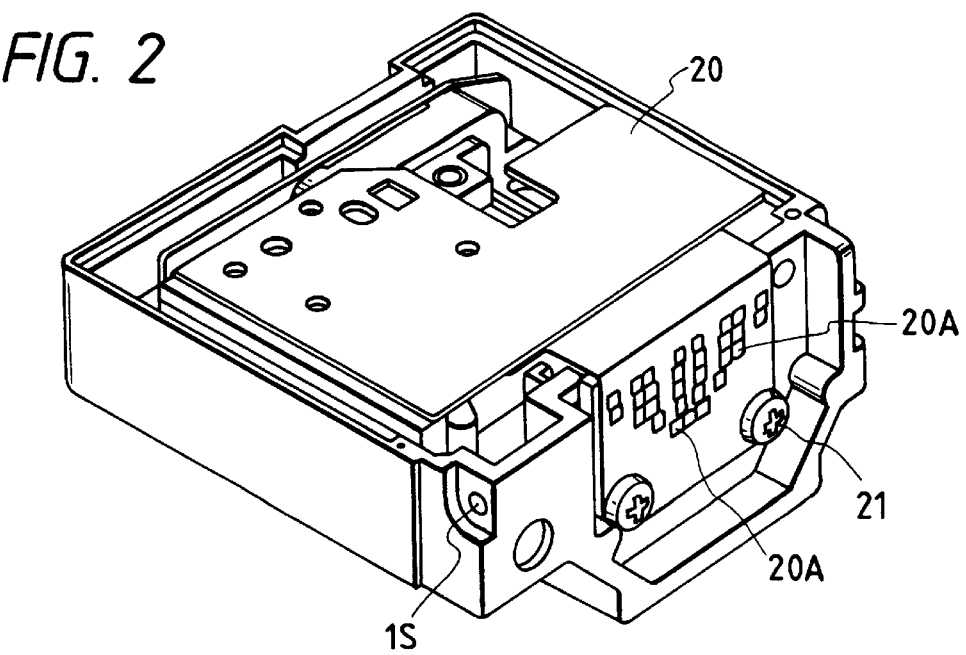
FIG. 2 is a perspective view which shows the arrangement of electrical parts in accordance with the present embodiment.
Figure 3:
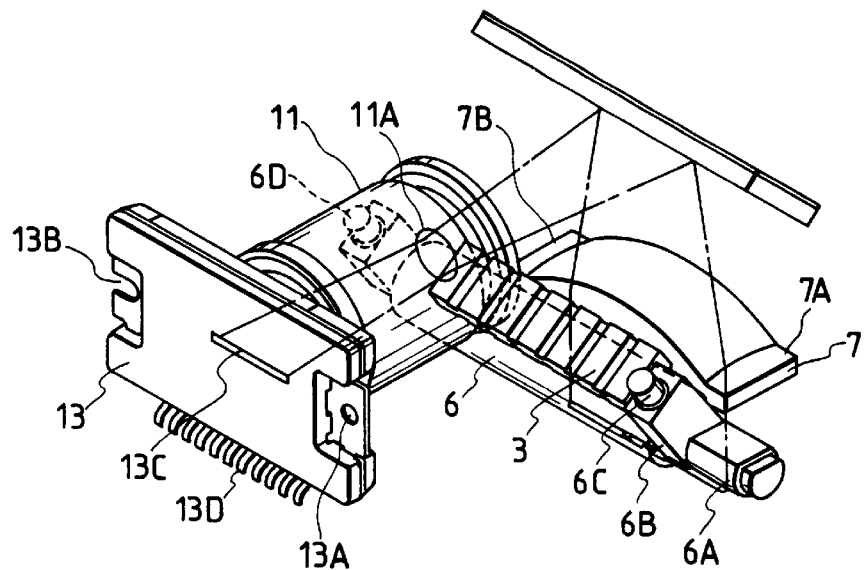
FIG. 3 is a perspective view which shows the arrangement of optical parts in accordance with the present embodiment.
Figure 4:
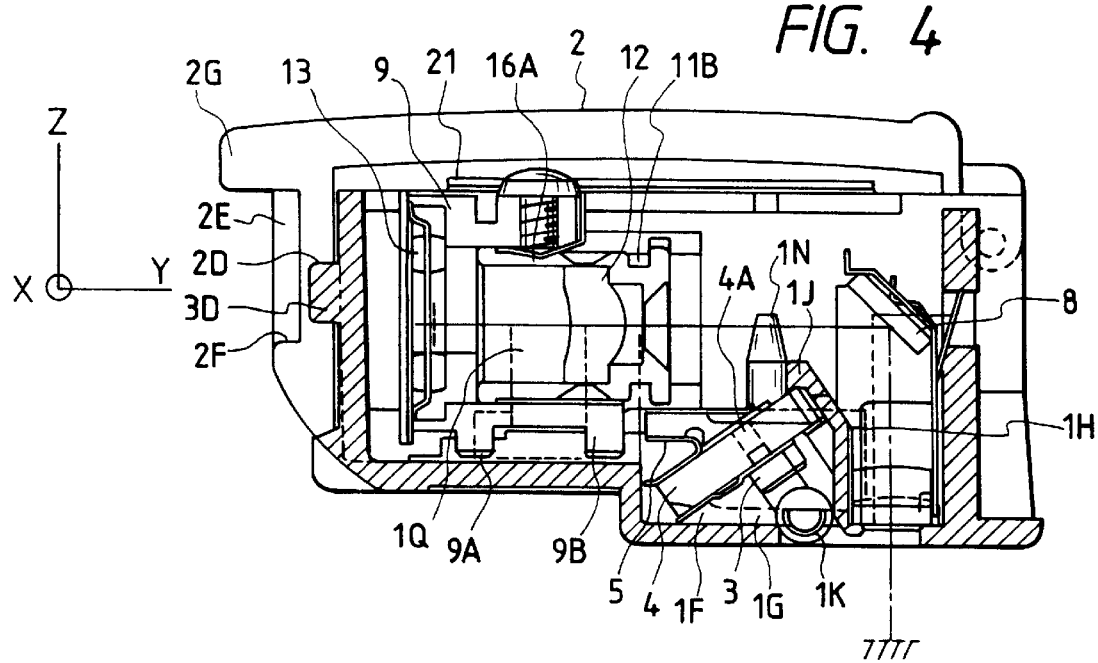
FIG. 4 is a side view which shows the inner structure in accordance with the present embodiment.

FIG. 1 to FIG. 3 are the views that most suitably illustrate the features of a scanner head cartridge in accordance with one embodiment of the present invention. FIG. 1 is a perspective view showing the outer appearance of the present embodiment. FIG. 2 is a perspective view showing the arrangement of electrical parts after removing the upper case 2 represented in FIG. 1. FIG. 3 is a perspective view showing only the arrangement of optical parts. FIG. 4 is a cross-sectional view showing a state that the upper case 2 and lower case 1 are coupled together.

In FIG. 1, a reference numeral 1 designates a lower case in which the optical parts, the electric board, and all other related parts are installed. This case is provided with a positioning hole 1B and a positioning groove 1C to position it when mounted on a carriage. A reference wall 1A is also provided for determining its posture in the reading direction. When being mounted on the carriage, the case is biased to the reference wall (not shown) on the carriage side to set its mounting position. A reference numeral 20A designates a connector unit serving as an inner I/F for making the electrical contact when being installed on the main body. This unit is fixed by means of screws 21 to the wall 1D, which is arranged in parallel with the reference wall 1A. A reference numeral 2 designates the upper case, which constitutes a scanner head cartridge 10 when it is coupled with the lower case in a mode that it covers the open face of the lower case 1.

The lower and upper cases 1 and 2 are provided with hooking means, and coupling means that makes the engagement by use of the hooking means more reliable. As hooking means, hinges 2C and 2D are provided for the upper case 2, while, holes 1S (see FIG. 2) for rotation are arranged on the lower case 1 for the hinges 2C and 2D to be inserted. The upper case 2 and lower case 1 are rotatively supported when the hinges 2C and 2D are inserted into the holes 1S for rotation.

Also, for the lower case 1, an extrusion 3D is provided on the side wall on the side opposite to the holes 1S for rotation, while on the upper case 2, an extrusion (hooking member) 2F is arranged with a recess 2D having the configuration to correspondingly fit with the extrusion 3D. The extrusion 2F and the side of the lower case 1 to face the extrusion 2F constitute coupling means.

Since the recess 2D of the extrusion 2F and the extrusion 3D constitute fitting means, it is possible to form the scanner head cartridge 10 having the upper and lower cases coupled when these extrusions are fitted together.

In this respect, it may be possible to provide an extrusion in place of the recess 2D of the extrusion 2F, while a recess is arranged instead of the extrusion 3D.

Also, the upper case 1 is opened and closed at the time of adjusting the optical system or conducting some other related operations in it. In order to facilitate the opening and closing thereof, the eaves 2G is formed to protrude from the lower case 1 on the side where the extrusion 2F is arranged for the upper case 1, which is opposite to the side where the hinges 2C and 2D are provided.

On the upper surface of the upper case 2, ears 2A and 2B are formed to serve as positioning guide means. When the scanner head carriage is inserted into the carriage main body, the ears 2A and 2B engage with the carriage, thus fitting the positioning hole 1B and positioning groove 1C with the positioning unit (not shown) on the carriage side in good condition.

FIG. 2 is a perspective view showing a state that the upper case 2 is removed.

A reference numeral 20 designates a flexible board having electrical parts mounted on it, which is formed substantially in a box type to embrace optical parts in it. On the end portion of the flexible board 20, a connector unit 20A is arranged. On the other end portion, an image sensor 13 (see FIG. 3) is installed. Further, as a light source to be described later, LEDs, and image processing circuit (not shown) and others are installed.

Now, with reference to FIG. 3 and FIG. 4, the description will be made of the arrangement of an optical system in accordance with the present embodiment.

A reference numeral 3 designates a plurality of LEDs ($\lambda$=570 nm) serving as a light source, which are arranged in parallel with the direction of reading width in a length longer than the reading width. Near the light source, LEDs 3, a cylindrical rod lens 6 that serves as converging means is arranged in parallel with the arrangement direction of the LEDs 3. Then, it is arranged to enable the center of irradiation from the LEDs 3 to pass the center of the active lens surface of the rod lens 6, hence irradiating the surface of a source document diagonally.

The optical axis of the reflective light from the source document passes a field lens 7, which is a first lens on the image focusing system arranged in the direction substantially at right angles to the source document. The advancing direction of the optical axis of the reflective light that has passed the field lens 7 is caused to bend 90 degrees by means of a mirror 8 arranged in parallel to the reading width direction so as to make the light beam substantially in parallel with the source document.

A reference numeral 11A designates an aperture at which the focusing surface of the field lens 7 in the first focus lens system is assumed to be positioned. Behind the aperture 11A, a focusing lens 12, which is a second focusing lens system, is arranged.

The focusing position of the focusing lens 12 is the position at which a photoelectric transfer element 13C is arranged. The photoelectric transfer element 13C is integrally formed with the flexible board 20 by soldering the connector 13D thereof to the flexible board 20, and packaged as the image sensor 13. In this respect, the arrangement of the focusing system lens is made at a contraction ratio of 0.45158.

Now, the description will be made of the state of the optical parts being incorporated. On the reverse side of the flexible board 20 where the LEDs 3 are arranged, an aluminum cooling plate 4 is adhesively bonded by means of a double-coated conductive adhesive tape. The irradiating angle of the LEDs 3 is determined by means of the flexible board 20 and the cooling plate 4 installed on the triangle ribs 1F and 1H of the lower case 1, and fixed when both ends of the cooling plate 4 is pressed down by the rod lens holder 5 that supports the rod lens 6 and the nail portion 1J of the lower case 1.

In FIG. 3, the rod lens 6 has a cylindrical lens portion installed as converging means to increase the quantity of light for the light source. The rod lens extrusions 6C and 6D, which are provided on both ends of non-irradiating portion are fitted into the positioning holes 4A of the cooling plate 4. Then, it is arranged as described above that the irradiation center of the LEDs 3 that serves as the light source passes the center of the circle in the direction at right angles to the cylindrical direction of the rod lens 6.

For both ends of the rod lens 6, rod lens bases 6A are arranged to be coaxial with the cylindrical shape of the lens portion, and then, by installing the rod lens 6 on the groove 1K of the lower case 1, the center thereof is positioned.

A D-letter shaped cut off portion is formed on the rod lens base 6A, and fixed by means of the folded ends of the rod lens holder 5. The D-letter cut off portion is made slightly higher on the triangle ribs 1F and 1H side of the lower case 1. When it is pressed down by the rod lens holder 5, it rotates counterclockwise in FIG. 3, thus fixing the rod lens 6 and the cooling plate 4 integrally in a state that the rod lens arm 6B is biased to the triangle rib 1B of the lower case 1.

The rod lens holder 5 is prevented from falling off when the fixing extrusion 1N of the lower case 1 penetrates both ends of the rod lens holder 5.

The optical axis on the diagonal irradiation side, which is determined by means of the triangle ribs 1F and 1G, is deviated by 1.5° farther in the depth direction from the central position of the surface of a source document set at the optical axis of the focusing lens when irradiation is made.

As described above, the center of irradiation from the light source is positioned farther in the depth direction than the reference position of the height of a source document. Therefore, it is possible to reduce the output variation even if the gap with the sheet is caused to change from the reference position, and in turn, to maintain high resolution and reduce the density unevenness.

Also, regarding the method for driving LEDs 3, the light source is preheated by means of electric current flowing for a specific period of time before reading. After that, LEDs are driven by low electric current in order to maintain a specific temperature thereof. In this way, the temperature of the light source is stabilized to reduce its output variation and reduce unevenness of image density to follow as the reading time elapses. Also, by the preheating of the light source, it is possible to shorten the standby time required for reading the second sheet and on.

Now, with reference to FIG. 5, the description will be made of a method for fixing a field lens 7 and a mirror 8 in accordance with the present embodiment.

A reference numeral 7A designates a mirror holder, which is a flat spring formed substantially in a concave shape. On the lower part thereof, fixing means is formed to position the field lens, and on the upper part thereof, fixing means is formed to position the mirror. The holder is structured to provide also the function of positioning both the lens and mirror.

In continuation, with reference to FIG. 4 and FIG. 6, the description will be made of a method for adjusting and positioning the focusing lens 12.

The focusing lens 12 that serves as the second focusing system lens is adhesively fixed to a cylindrical lens barrel 11 forming an aperture 11A. The lens barrel 11 is slidable along the inner circumference of the lens holder 9. A jig (not shown) is inserted into a barrel groove 11B to adjust movement. A reference numeral 16 designates a lens stopper having a flat spring capability. The angled portion thereof is provisionally held to bias the lens barrel 11 downward at all times. After its regular adjustment, it is fixed by means of screws 21.

The lens holder 9 slides in the sliding groove 1S of the lower case 1. The extrusions 9A and 9B of the groove are formed in parallel with the optical axis. The inner circumference of the lens holder 9 is in parallel with the groove extrusions 9A and 9B. The focusing lens 12 slides in parallel with the optical axis to determine its position in the direction Y. Flanges 9A and 9B slide on the rib 1Q that has a flat surface whose height is the same as that of the optical axis in parallel with the surface of a source document. Elongated holes are formed on the flanges 9A and 9B, which are used for fixing the lens holder 9 by means of screws after its position has been adjusted.

Behind the focusing lens 12, the image sensor having the photoelectric transfer element 13C is arranged as described above. The image sensor is provided with positioning holes 13A and 13B on the lines parallel to the alignment of the photoelectric transfer element 13C. The positioning holes 13A and 13B fit the positioning extrusion (not shown) on the lens holder, which are in parallel with the flanges 13A and 13B, thus determining the optical axis in the direction Z.

The image sensor is fixed to the lens holder 9 by means of screws through the fixing holes (not shown) on the flexible board 20 to which the sensor is soldered.

In accordance with the present embodiment, the arrangement of the optical lenses are arranged to form a telecentric system as described above. Therefore, the variation of magnification is made small.

Now, with reference to FIG. 7, the description will be made of a state where a scanner head cartridge structured as described above is mounted on the main body of a recording apparatus in accordance with the present embodiment.

Figure 7:
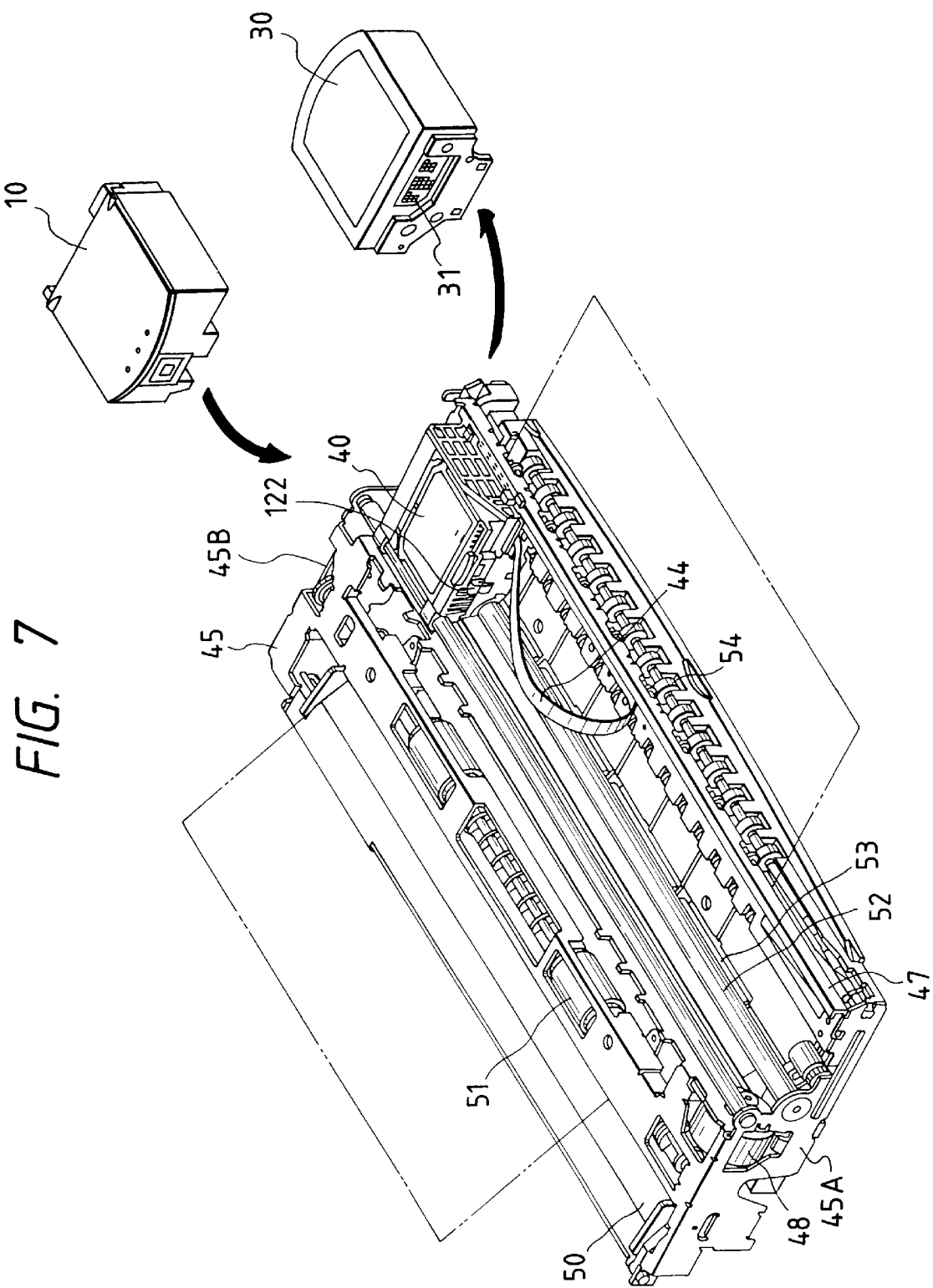
FIG. 7 is a view which shows a state of the main body being installed in accordance with the present embodiment.

In FIG. 7, a reference numeral 10 designates a scanner head cartridge detachable and exchangeable with a recording head cartridge 30 that records on a recording medium.

The shape of the scanner head cartridge 10 is the same as that of the recording head cartridge to be used for printing. A connector unit 20A that can be shared by the recording head cartridge for use is arranged on a portion of the scanner head that electrically connected with the main body.

A reference numeral 40 designates a carriage provided with a contact-point unit (not shown) to transmit or receive reading control signals to and from the main body through the connector unit 20A of the scanner head cartridge 10. The scanner head cartridge 10 is pressed to the contact-point unit by means of a head guide 122, thus reliably maintaining the engagement between the carriage 40 and the scanner head cartridge 10.

The reading signals are processed by a CPU provided for the apparatus main body through the connecting unit and a flexible cable 44.

The carriage 40 reciprocates along a slide shaft and a slide plate 47 between the side plates 45A and 45B of a frame 45 for the reading performance. A reference numeral 48 designates a driving motor to drive the carriage 40 through a belt 45.

A reference numeral 50 designates a sheet supply stacker to feed a source document. When it is used for a printer, a recording sheet is inserted. The source document 3 is fed from the sheet supply stacker 50 by means of a feed roller 51 to the rear side of the printer, and carried by means of an LF roller 52 and a pressure roller 53 to the reading position underneath the carriage 40. While being carried by means of repeated intermittent line feeds each for a portion of reading width, the source document is exhausted by means of a sheet exhaust roller 54 in due course of time.

Figure 8:
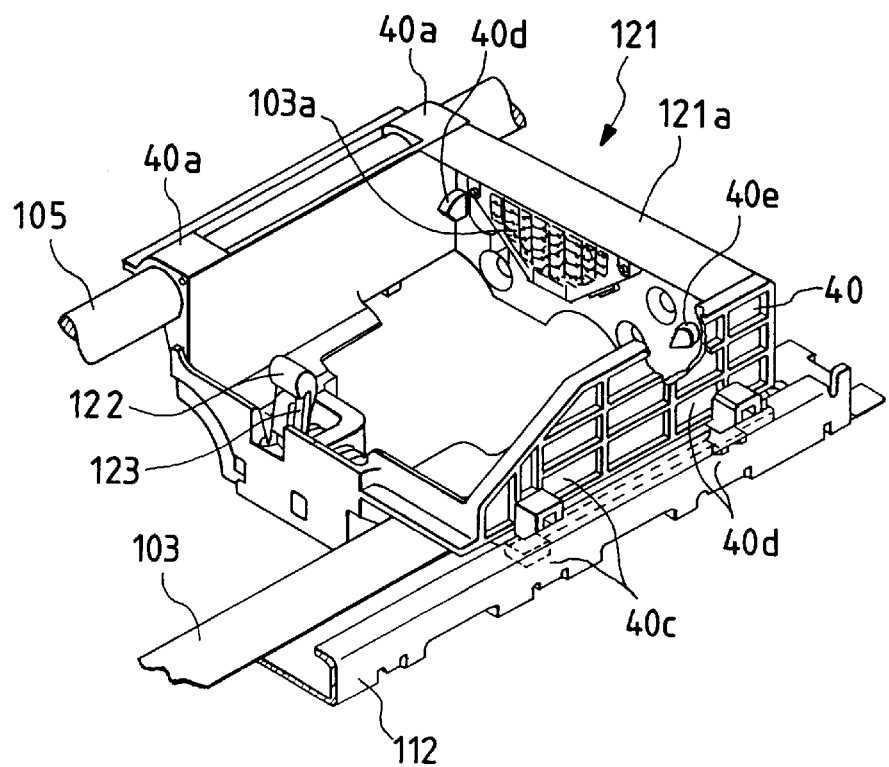
FIG. 8 is a perspective view which shows the carriage of the ink jet recording apparatus represented in FIG. 7.

Now, the carriage will be described with reference to FIG. 8. FIG. 8 is a perspective view which shows the carriage 40 of an ink jet recording apparatus represented in FIG. 1.

The carriage 40 is configured to be a frame type as a whole. In its hollow section, the scanner head cartridge 10 or a recording head cartridge 101 is mounted. On the back of the carriage 40, two bearings 40a are formed integrally. The guide shaft 105 is inserted through each of the bearings 40a. Also, on the front of the carriage 40, two nippers, a guide rail nipper 40b and a stopper 40c to prevent the carriage deformation, are integrally formed. The guide rail nipper 40b is arranged on the cable pressure holder 121 side, and the stopper 40c to prevent the carriage deformation is arranged on the head guide 122 side. The guide rail nipper 40b, and the stopper 40c to prevent the carriage deformation are formed by two protruding members each with a gap in the top and bottom direction, having the plate type guide rail 112 between them. The carriage 40 is thus supported by the two bearings 40a, the guide rail nippers 40b and the stopper 40c to prevent the carriage deformation. In this way, the carriage 40 is supported in parallel to the base 114 (see FIG. 1), and then, it is made possible to maintain substantially a constant gap between a recording medium P and the nozzle unit 150 (see FIG. 10) of the recording head cartridge 101 mounted on the carriage 40.

However, the gap between two members that form the stopper 40c to prevent the carriage deformation is larger than the gap between two members that constitute the rail nipper 40b. Essentially, however, the carriage 40 is supported by the three points, which exclude the stopper 4c to prevent the carriage deformation. This is because in order to support the carriage 40 in parallel with the base 114, the carriage 40 can be supported sufficiently by the three points that are not aligned on one and the same straight line, which are thus arranged in consideration of the sliding load to be exerted on the carriage 40. Further, the stopper 40c to prevent the carriage deformation is provided for avoiding the unwanted displacement and deformation of the carriage 40 due to the load given to the guide rail nipper 40b and each of the bearings 40a when the ink head cartridge 101 is mounted on or demounted from the carriage 40. In this way, any drawbacks are prevented from occurring when carrying out required operations. Also, the stopper 40c to prevent the carriage deformation is installed on the head guide 122 side. This is because, as described later, force is exerted on this head guide 122 at the time of the recording head cartridge 101 being mounted on or demounted from the carriage 40.

The flexible cable 103 is drawn around a given path, and fixed by means of the cable pressure holder 121 so as to position the cable terminal 103a, which is fixed to the leading end of the flexible cable, inside the side wall of the carriage 40 as shown on the right-hand side in FIG. 8. The head connector 153 (see FIG. 10) of the recording head cartridge 101 is in contact with the cable terminal 103a when the recording head cartridge 101 is mounted on the carriage 40. Thus, the electrical connection with the recording head cartridge 101 is made.

The cable pressure holder 121 is formed by folding a plate member of stainless steel or other conductive material. The upper end thereof is made to be a covering portion 121a folded over inside the carriage 40. Also, a part of the cable pressure holder 121 is in contact with the GND pattern of the flexible cable 103. In other words, the cable pressure holder 121 is grounded through the flexible cable 103. This is arranged to discharge to GND the static electricity charged to the fingers of an operator, the static electricity accumulated on the recording head cartridge 101, or the like when the operator mounts or demounts a recording head cartridge 101 on or from the carriage 40. In this way, the static electricity or the like is prevented from being discharged to the cable terminal 103a so as not to damage the control board of an ink jet recording apparatus.

Also, by the formation of the covering portion 121a of the cable pressure holder 121, the cable terminal 103a is placed beneath the covering portion 121a so that the operator does not unconsciously touch the cable terminal 103a with his fingers or the like. Thus, not only the static electricity can be easily discharged to the cable pressure holder 121, but also, the cable terminal 103a itself is protected by the covering portion 121a.

On the face of the carriage 40 where the cable terminal 103a is located, two head positioning extrusions 40d and 40e are integrally formed. The positioning extrusion 40d is square and located in the deeper side than the cable terminal 103a, while the positioning extrusion 40e is circular having conical top, and located on the front side more forwardly than the cable terminal 103a. In a state that the recording head cartridge 101 is mounted on the carriage 40, one of the head positioning extrusion 40d is fitted into the cut off groove 153a (see FIG. 10) for use of head positioning for the recording head cartridge 101. At the same time, the other positioning extrusion 40e is fitted into the head positioning hole 153b (see FIG. 10) of the recording head cartridge 101. Thus, the recording head cartridge 101 is exactly positioned on the carriage 40. As clear from the above description, positioning means for the carriage 40 is formed by each of the head positioning extrusions 40d and 40e, while positioning means for the recording head cartridge 101 is formed by the cut off groove 153a for use of head positioning, and also, the head positioning hole 153b.

Further, on a location of the carriage 40 that faces the cable terminal 103a, a contact spring 123 is provided, and a resin-formed head guide 122 is fixed to the leading end of the spring. In other words, the head guide 122 is elastically supported by the carriage 40. The head guide 122 fits the head pressure portion 160d (see FIG. 11) of the recording head cartridge 101 in a state that the recording head cartridge 101 is mounted on the carriage 40 as described later. Thus, the recording head cartridge 101 is biased to the cable terminal 103a by the spring force of the contact spring 123. By arranging the cable terminal 103a and the head guide 122 to face each other, the contact is made reliably between the cable terminal 103a and the head terminal 153. The head guide 122 also serves as a guide when the recording head cartridge 101 is mounted on the carriage 40.

Figure 9:
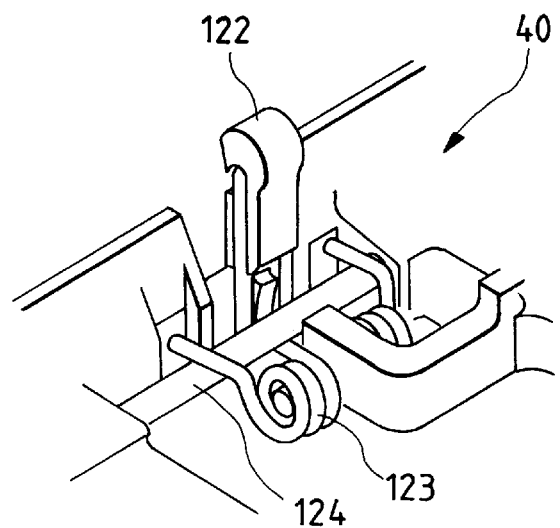
FIG. 9 is a perspective view which shows the vicinity of the head guide of the carriage represented in FIG. 8.
Figure 8:
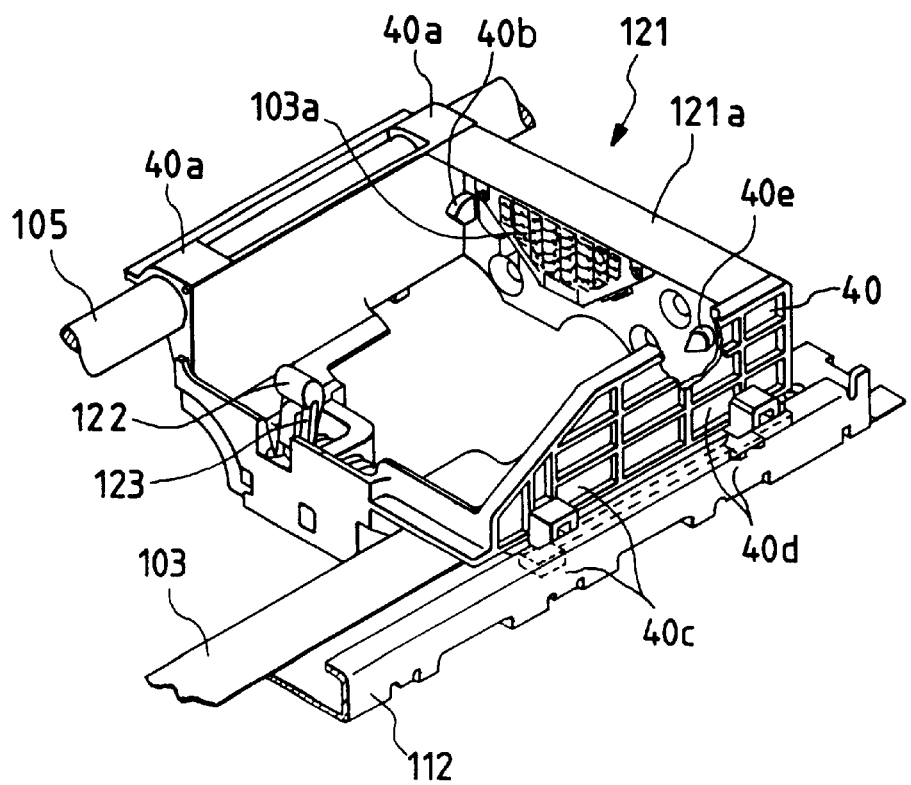
Figure 9:
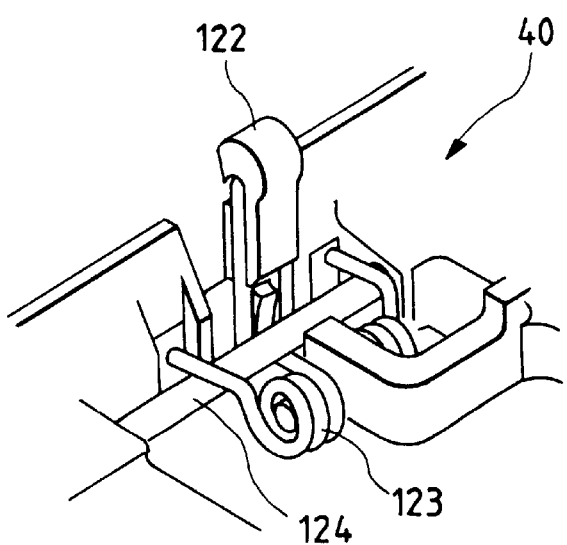

In accordance with the present embodiment, a torsional coil spring of a double torsion type is used for the contact spring 123 as shown in FIG. 9. The two coil portions are supported by a supporting rod, which is integrally formed with the carriage 40. At the same time, the ends extended from the respective coils nip the metallic shaft member 124 supported by the carriage 40. In this way, when a load is given to the contact spring 123, it is possible to disperse any load to be exerted on the carriage 40, and to prevent the carriage 40 from being deformed. Also, the pressure given to the recording head cartridge 101 by the contact spring 123 is set at approximately 2 kgf in order to make the contact more reliable between the cable terminal 103a and the head terminal 153 when the recording head cartridge 101 is mounted on the carriage 40.

As described above, the covering portion 121a is formed for the cable pressure holder 121, while the head guide 122 is positioned in a location to face the cable terminal 103a. Therefore, when the recording head cartridge 101 is mounted on the carriage 40, the face of the recording head cartridge 101 on the head terminal 153 side is allowed to get into underneath the covering portion 121a, and then, the recording head cartridge 101 is mounted while being rotated with the leading end of the covering portion 121a as a pivot. Here, the covering portion 121a serves as a guide when the recording head cartridge 101 is mounted. Also, it contributes to mounting the recording head cartridge 101 in a smaller space.

Here, in order to increase the capacity of ink to be retained in the ink tank, the recording head cartridge 101 is configured to fit the shape of the carriage 40. The shape of the recording head cartridge itself dually serves as a guide. Therefore, it is made easier to mount it on the carriage 40 just by inserting the lower part of the bottom thereof along the inner wall of the bottom of the carriage 40.

Also, since the covering portion 121a is extended over and above the cable terminal 103a, the base plate 151 or the like of the recording head cartridge 101 abuts upon the covering portion 121a before it contacts the cable terminal 103a unless the face of the recording head cartridge 101 on the head terminal 153 side is allowed to get into underneath the covering portion 121a. In this way, the cable terminal 103a is prevented from being damaged by the recording head cartridge 101 at the time of insertion.

Figure 10:
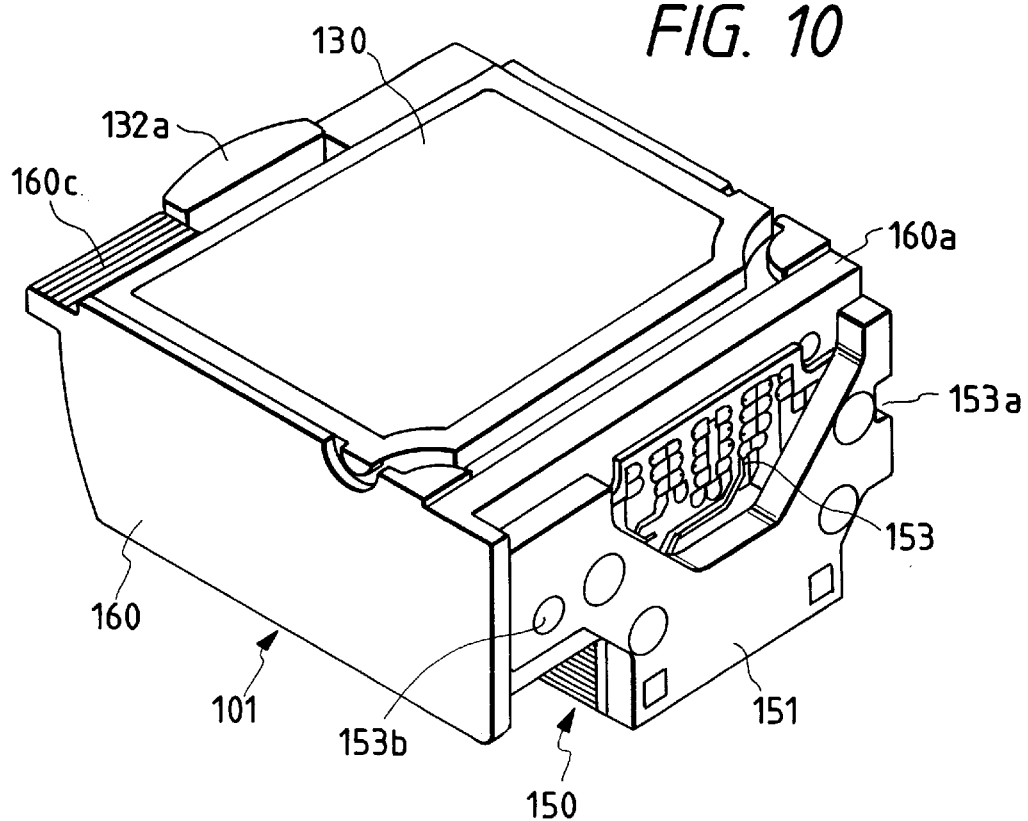
FIG. 10 is a perspective view which shows the recording head cartridge to be mounted on the ink jet recording apparatus represented in FIG. 1, observed in the direction in which the head terminal unit is visible in a state that an ink tank is installed.
Figure 11:
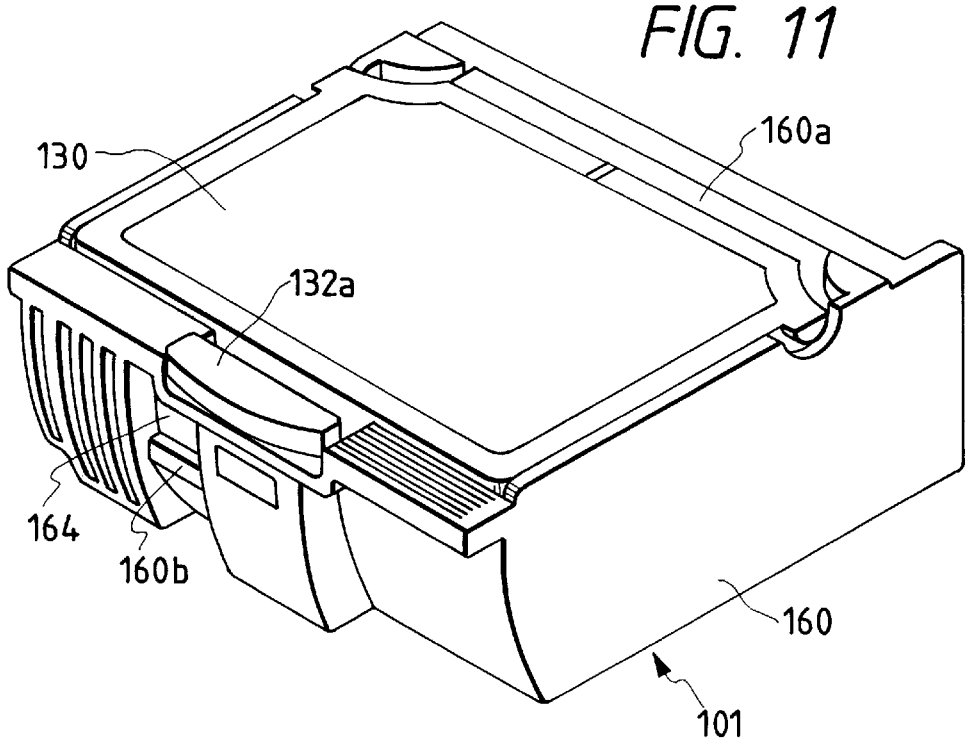
FIG. 11 is a perspective view which shows the recording head cartridge to be mounted on the ink jet recording apparatus represented in FIG. 1, observed in the direction in which the opposite side of the head terminal unit is visible in a state that an ink tank is installed.

Now, the recording head cartridge 101 will be described. FIG. 10 is a perspective view showing the recording head cartridge 101, observed in the direction in which the head terminal 153 is visible. FIG. 11 is a perspective view showing the recording head cartridge 101 in the direction in which the opposite side of the head terminal 153 is visible.

The recording head cartridge 101 is formed integrally with a nozzle unit to discharge ink, and with a box type holder 160 having an aperture on the upper surface thereof as shown in FIG. 10 and FIG. 11. An ink tank 130 that retains ink is detachably mounted inside the holder 160.

The head terminal 153 is an electric board formed by glass epoxy or the like, and fixed to the base plate 151. Wires connected with a plurality of electro-thermal transducing elements, which constitute the nozzle unit, are connected to the head terminal 153 by means of wire bonding. Also, the base plate 151 is installed at an inclination of one to four degrees to the carrying direction of a recording medium P. The row of plural discharge ports that forms the nozzle unit is also inclined at an angle of one to four degrees to the carrying direction of a recording medium accordingly.

The ink, which is supplied from the ink tank 130 to the common liquid chamber constituting the nozzle unit and retained in it temporarily, is caused to enter the liquid paths by means of capillary phenomenon, and form meniscus at the discharge ports, hence keeping the paths in a state of being filled with ink. At this juncture, when the electrothermal transducing elements are energized to generate heat in response to recording signals transmitted to the head terminal 153, ink on the electrothermal transducing elements are heated abruptly to create film boiling, thus generating air bubbles in the liquid paths accordingly. By the expansion of each of the air bubbles, ink is discharged from the respective discharge ports. Here, as energy generating elements to generate energy, the electro-thermal transducing elements are exemplified, but the present invention is not necessarily limited thereto. It may be possible to use the piezoelectric elements that generate mechanical energy to exert discharging pressure instantaneously.

On locations of the base plate 151 that face each of the head positioning extrusions 40d and 40e of the carriage 40, the head positioning cut off 153a is formed to fit the square head positioning extrusion 40d when the recording head cartridge 101 is mounted on the carriage 40, and also, the head positioning hole 153b is formed to fit the circular head positioning extrusion 40e likewise.

The base plate 151 is fixed to the wall on one end of holder 160 by means of thermal bonding or ultrasonic bonding. On the end portion on the upper surface of the holder 160 on the base plate side, a step 160a is formed to make such portion one step lower than the other portions. When a recording head cartridge 101 is mounted on the carriage 40, the upper surface of this stepped portion 160a is allowed to get into underneath the covering portion 121a (see FIG. 8) of the cable pressure holder 121. Then, the recording head cartridge 101 is roughly positioned with ease. Also, as a mechanism to detachably mount the recording head cartridge 101 on the carriage 40, there are formed a head pressure unit 160b serving as a fixture supported by the head guide 122 (see FIG. 8) of the carriage 40, and a head mounting and demounting operation unit 160 to detachably mount the recording head cartridge on the carriage 40, respectively, on the side of the holder 160 opposite to the base plate 151, that is, on the outer face of the wall on the other edge of the holder mounted on the carriage 40. The head pressure unit 160b is a recessed portion formed diagonally from the lower end to the upper end portion of the face on the side of the holder 160 opposite to the base plate 151. The upper part of the head pressure unit 160b is a head guide coupler 164, which is more recessed, and the head guide 122 of the carriage 40 engages with this head guide coupler 164 when the recording head cartridge 101 is mounted on the carriage 40. Then, as the head guide 122 engages with the head guide coupler 164, the recording head cartridge 101 is positioned to the carriage 40 and fixed. The head mounting and demounting operation unit 160c is arranged on the upper end portion of an area farthermost from the head pressure unit 160b on the front side of the recording head cartridge 101, that is, the face where the head pressure unit 160b is installed. The operator hooks his fingers on this unit to pull it up when removing the recording head cartridge 101 from the carriage 40. As a result, the removal is made easier.

These head pressure unit 160b, and the head mounting and demounting operation unit 160c are arranged respectively in the areas that are recessed relatively to the extruded area formed by the provision of a latch guide groove 160h (see FIG. 14) serving as a latch lever guide 132a, which will be described later. In this way, the limited volume of the recording head cartridge 101 is effectively utilized to provide the fixture unit supported by the head guide 122 of the carriage 40, as well as the head mounting and demounting operation unit, with the minimal space to be used for the purpose.

Now, the description will be made of the mounting and demounting operation of a recording head cartridge 101 on and from a carriage 40.

In this respect, the upstream side of the carrying direction of a recording medium P is defined as depth side, and its face, as back, while the downstream side thereof is defined as front side, and its face as front in the description given below.

Figure 12:
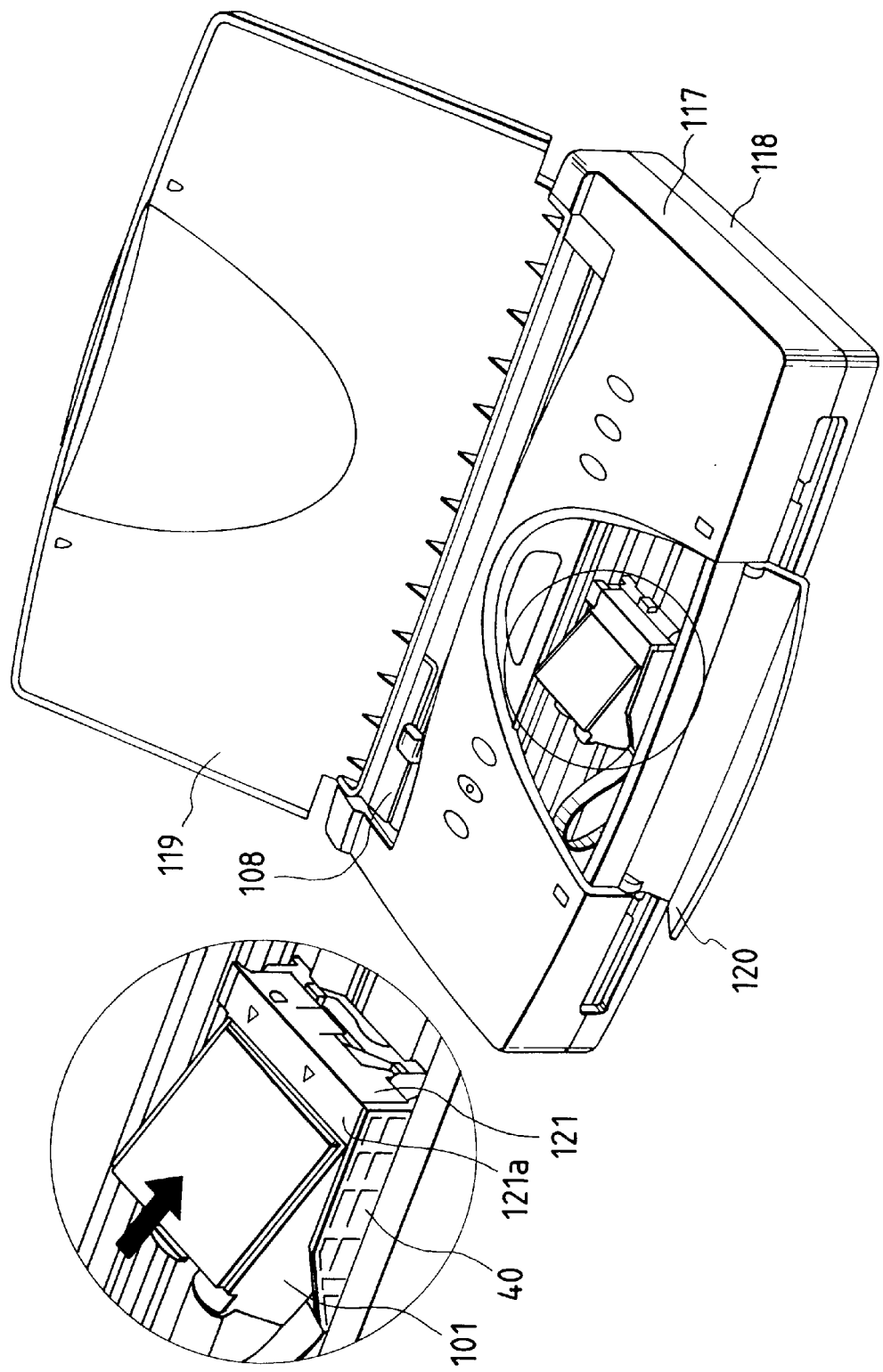
FIG. 12 is a perspective view which shows the first step of the procedure for mounting a recording head cartridge on a carriage in the ink jet recording apparatus represented in FIG. 2.

FIG. 12 is a perspective view showing the state in which the ink jet recording apparatus represented in FIG. 8 is placed in a housing. As shown in FIG. 12, its exterior is formed by a lower case 118 and an upper case 117. In its interior, the ink jet recording apparatus shown in FIG. 8 is arranged.

On the depth side portion of the upper case 117, the top cover 119 that can be freely opened and closed is arranged to cover the upper case 117. The upper case 117 is provided with an aperture on the location facing a pressure plate 108. The top cover 119 serves as a tray to set a recording medium on the pressure plate 108 when the top cover 119 is opened. Further, the upper case 117 is provided with an aperture from its central part to the front. Through this aperture, it is possible to mount or demount a recording head cartridge 101 or an ink tank 130. Therefore, when the recording head cartridges 101 or the ink tanks 130 are exchanged, the carriage 40 is caused to shift in the central part of its traveling range by means of a given operation. On the front side of this aperture for use of exchanging recording head cartridges 101 or ink tanks 130, a head cover 120 is installed to be freely opened and closed to cover the upper surface of this aperture partly or totally. When no recording head cartridge 101 nor any ink tank 130 is exchanged, the head cover 120 is closed to protect the recording head cartridge 101 in use.

When a recording head cartridge 101 is mounted on the carriage 40, the side of the recording head cartridge having the base plate 151 arranged (see FIG. 10) is at first inserted diagonally as indicated by an thick arrow in FIG. 12, while allowing such side to get into underneath the covering portion 121a of the cable pressure holder 121 installed on the carriage 40. The standing face of the stepped portion 160a (see FIG. 10) of the recording head cartridge 101 abuts upon the end face of the covering portion 121a, thus roughly positioning the recording head cartridge 101.

Figure 13:
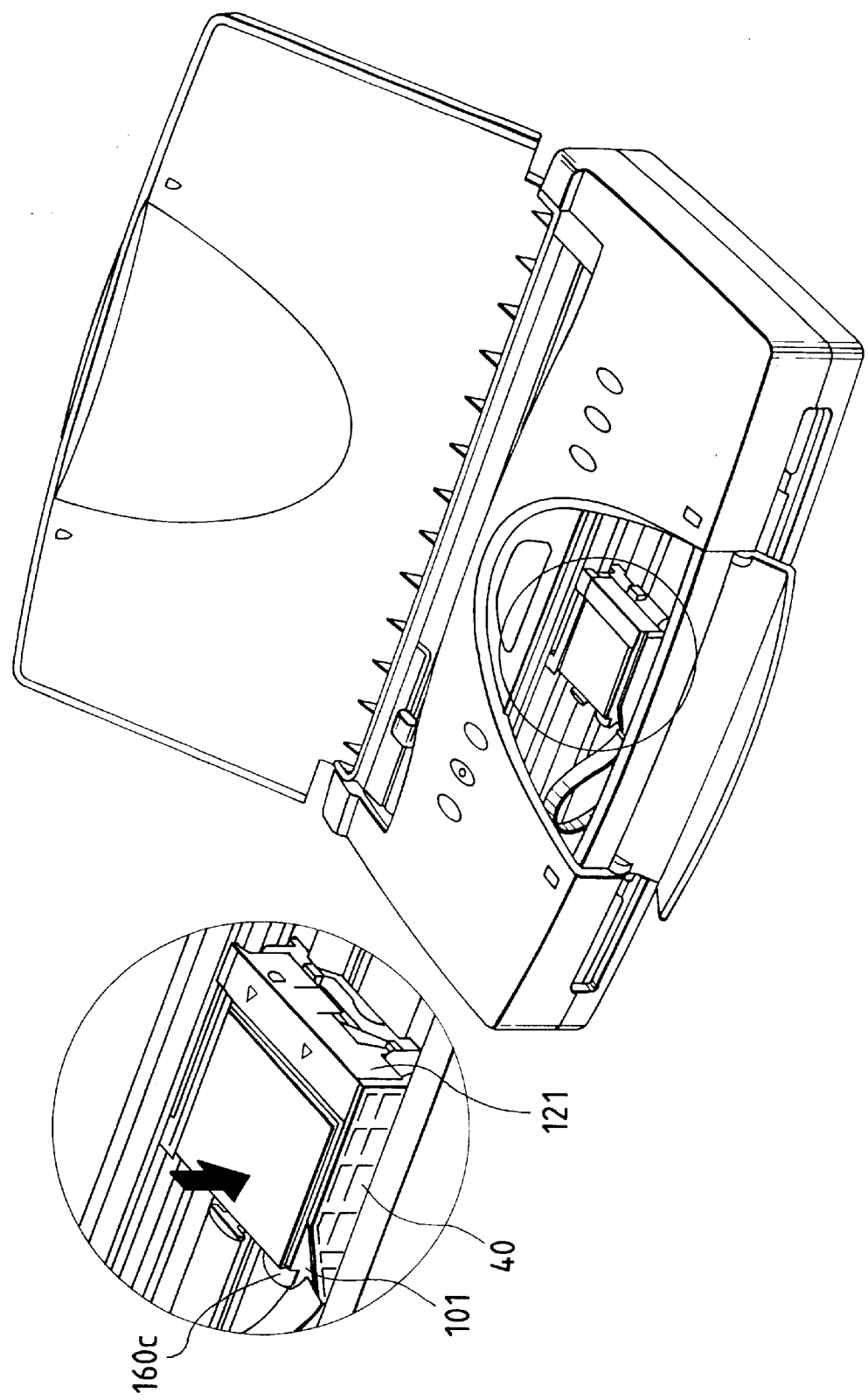
FIGS. 13A and 13B are views which show the second step of the procedure for mounting on the recording head cartridge on the carriage of the ink jet recording apparatus represented in FIG. 2.

Then, the recording head cartridge 101 is pressed in downward as shown in FIG. 13A and 13B. At this juncture, the inclined face of the head pressure unit 160d (see FIG. 11) of the recording head cartridge 101 is guided by the head guide 122 (see FIG. 8) of the carriage 40 so that each of the head positioning extrusions 40d and 40e is being fitted into the head positioning cut off 153a and the head positioning hole 153b of the recording head cartridge 101, respectively. Hence, the recording head cartridge 101 is mounted on the-carriage 40 smoothly. When the recording head cartridge 101 is completely mounted, the head guide 122 engages with the head guide coupler 164 (see FIG. 11) to fix the recording head cartridge 101. Also, by the force of compression exerted by the head guide 122, the head terminal 153 of the recording head cartridge 101 is pressed to the cable terminal 103a of the carriage 40 to reliably make the electrical connection between them.

When the recording head cartridge 101 is removed from the carriage 40, the head mounting and demounting operation unit 160c of the carriage 40 is pulled up. Then, the engagement between the head guide 122 and the head guide coupler 164 is released. The head pressure unit 160b is raised onto the head guide 122, thus causing the head mounting and demounting operation unit 160c side of the recording head cartridge 101 to protrude from the carriage 40 to be in an inclined state. Then, the portion thus protruded from the carriage 40 is picked up so that the recording head cartridge 101 can be easily removed from the carriage 40.

Also, on the face where the head pressure unit 160b is installed, the head mounting and demounting operation unit 160c is arranged in a location farthermost from the head pressure unit 160b. As a result, the moment that acts at the time of the head guide coupler 164 being released from the head guide 122 becomes greater when the head mounting and demounting operation unit 160c is pulled up. Thus, it is made possible to remove the recording head cartridge 101 by the application of a small amount of force. The mounting and demounting of the recording head cartridge 101 becomes easier accordingly, while it can be held assuredly.

Here, in order to make it possible to remove the recording head cartridge 101 by the application of a smaller amount of force, an arrangement should be made so that the head pressure unit 160b is located on the depth side from the center line parallel to the traveling direction of the carriage 40, and then, the head mounting and demounting operation unit 160c is located on the end portion on the front side.

Figure 14:
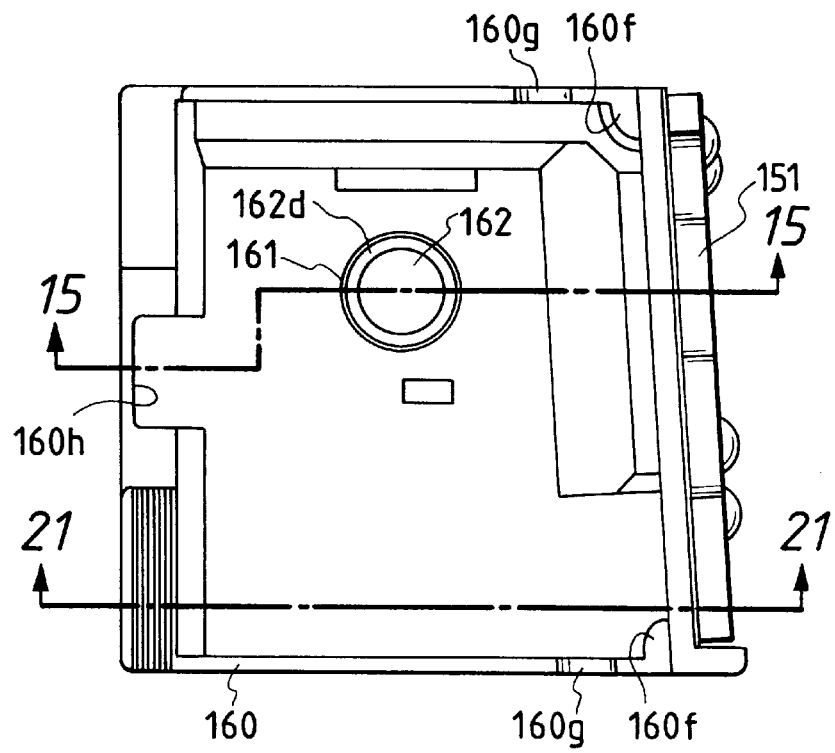
FIG. 14 is a plan view which shows the recording head cartridge represented in FIG. 10.
Figure 15:
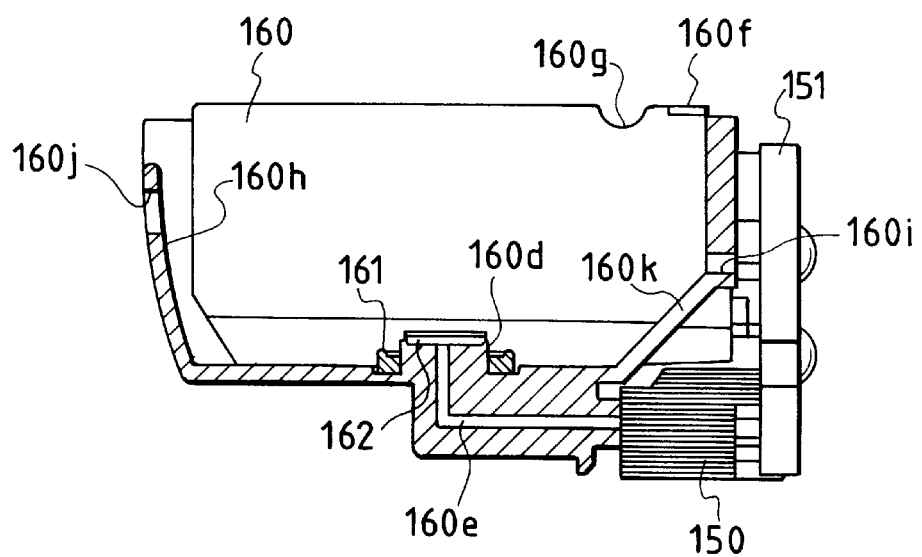
FIG. 15 is a cross-sectional view which shows the recording head cartridge, taken along line 15—15 in FIG. 14.

FIG. 14 is a plan view showing the recording head cartridge 101 represented in FIG. 10. FIG. 15 is a cross-sectional view of the recording head cartridge 101, taken along line 15—15 in FIG. 14. As shown in FIG. 14 and FIG. 15, an ink inlet tube 160d is arranged protrusively on the bottom wall of the holder 160. An ink path 160e that is open to this ink inlet tube 160d is conductively connected with the common liquid chamber 150c (see FIG. 8) of the nozzle unit 150. On the circumference of the ink inlet tube 160d, an elastic seal ring member 161 formed by rubber or the like is fixed. Also, on the open end of the ink inlet tube 160d, a filter 162 is installed to prevent foreign particles from being drawn into the nozzle unit 150.

On the upper end portion of the holder 160 on the base plate 151 side, expanded portions 160f are formed each on both corners. Further, in the vicinity of such portions, the tank extrusion guiding portions 160g, each formed in a semicircular recess, are arranged. On the other hand, a latch lever guiding groove 160h is formed on the inner wall of the holder 160 on the side opposite to the base plate 151. This groove serves as a guide for the latch lever 132a (see FIG. 10 and FIG. 11) when an ink tank 130 (see FIG. 10 and FIG. 11) is mounted. Further, on the end where the bottom wall of the holder 160 and the wall on the base plate 151 side intersect, an inclined face 160K is formed.

Figure 16:
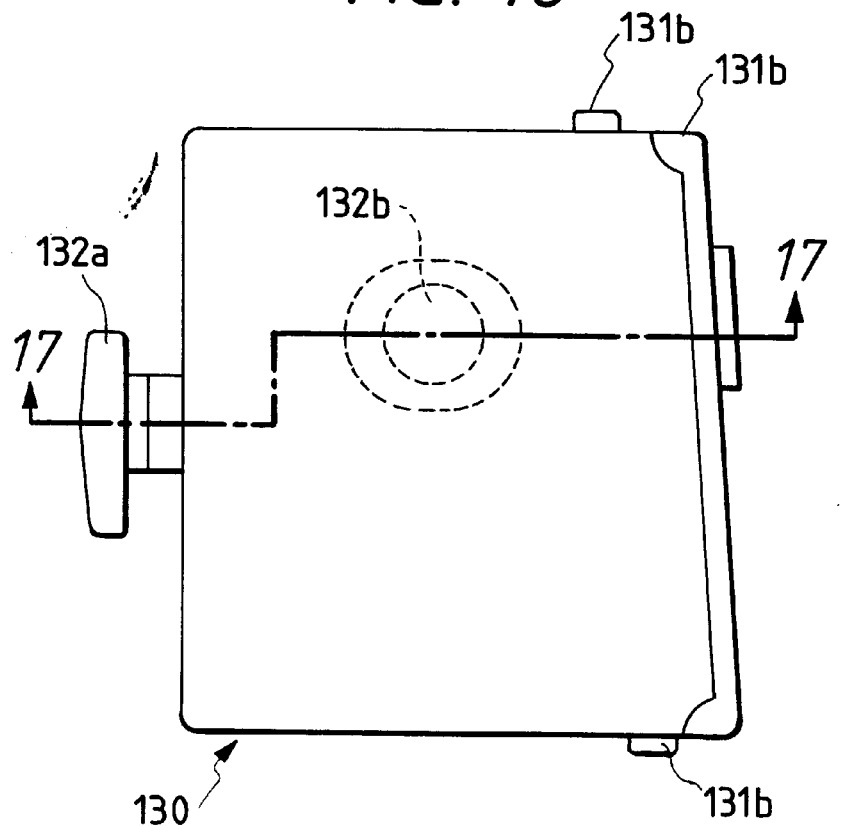
FIG. 16 is a plan view which shows the ink tank installed on the recording head cartridge represented in FIG. 10.
Figure 17:
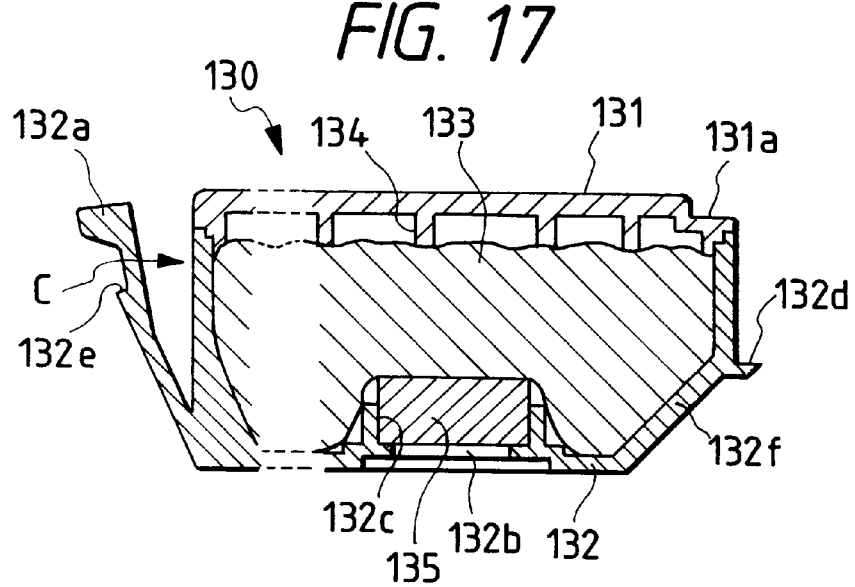
FIG. 17 is a cross-sectional view which shows the ink tank, taken along line 17—17 in FIG. 16.
Figure 18:
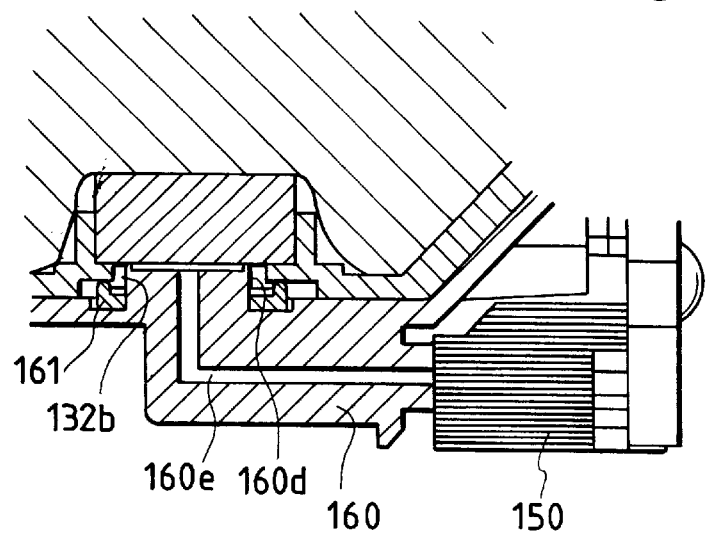
FIG. 18 is a cross-sectional view which shows a state of the ink supply port of the ink tank and the holder represented in FIG. 17 being coupled together.

Here, the description will be made of the ink tank 130 to be mounted on the recording head cartridge 101. FIG. 16 is a plan view showing the ink tank 130 mounted on the recording head cartridge 101 represented in FIG. 10. FIG. 17 is a cross-sectional view of the ink tank 130, taken along line 17—17 in FIG. 16.

The ink tank 130 is provided with a container 132 to retain ink, and a lid member 131 having an air conduit aperture (not shown), which covers the container 132 to seal it.

On the bottom of the container 132, an ink supply port 132b is formed, into which the ink inlet tube 160d (see FIG. 15) of the holder 160 is inserted. On the circumference thereof, a cylindrical supporting member 132c is planted. The ink supply port 132b is sealed by a sealing material (not shown) before the holder 160 is mounted on the ink tank 130 for the prevention of ink leakage.

In the container 132, an ink absorbent 133 formed by sponge or the like is contained. Ink is absorbed into this ink absorbent 133 and held in it. In a supporting unit 132c, an ink supply member 135 formed by a bundle of unidirectional fabric is inserted and supported in it. The ink absorbent 133 is closely in contact with the upper end face of the ink supply member 135. Ink absorbed into the ink absorbent 133 is conducted to the ink supply port 132b through this ink supply member 135. When the ink tank 130 is mounted on the holder 160, the ink inlet tube 160d of the holder 160 is inserted into the ink supply port 132b to connect them conductively. Then, ink is supplied to the nozzle unit 150 through ink path 160e. At this juncture, the seal ring 161 on the circumference of the ink supply port 132b is closely in contact with the outer end portion of the ink supply port 132b to suppress ink leakage.

Also, in order to conductively connect the ink supply port 132b and the air conduit aperture through an air layer, ribs 134 (in FIG. 17, only the rib 134 of the lid member 131 being shown) are formed at given locations in the interior of the container 132 and the lid member 131. Thus specific spaces are formed among the ink absorbent 133, the container 132, and the lid member 131. At the same time, on a part of the inner face of the supporting unit 132c, a slit (not shown) is arranged to conductively connect the interior of the container 132 and the outside. In this way, the interior and exterior of the ink tank 130 are connected conductively through the air layer, thus preventing ink from spouting or leaking from the ink supply port 132b when the sealing material that seals the ink supply port 132b is peeled off. Also, ink in the ink tank 130 is not squeezed out even if the circumferential temperature of ink tank 130 rises during a recording operation. Further, ink does not reside on the inner wall of the container 132. Hence, there is no fear that ink leaks from the ink supply port 132b and the air conduit aperture. The ink consumption efficiency is also enhanced accordingly.

Meanwhile, as the external structure of the ink tank 130, a fall-off stopper nail 132d is integrally formed with the container 132 as a nail type extrusion on the face of the ink tank 130 that abuts upon the inner wall of the holder 160 on the base plate 151 side when it is mounted on the holder 160. This fall-off stopper nail 132d fits the tank fall-off stopper hole 160i (see FIG. 15), which is formed on the holder 160 to serve as a guide for the ink tank 130 being mounted on the holder 160, and at the same time, to serve as a support for the ink tank 130 in a state that the ink tank 130 is mounted on the holder 160. Also, an inclined face 132f is formed on the end where the bottom wall of the container 132 intersects the face on which the fall-off nail 132d is arranged. The angle and configuration of this inclined face 132f are almost equal to the angle and size of the inclined face 160K (see FIG. 15) of the holder 160.

Further, on the other end face that is an outer wall on the side opposite to the side where the fall-off nail is arranged, a latch lever 132a whose lower end is elastically supported is integrally formed. The latch lever 132a is inclined toward the outer upper part of the ink tank 130 to fit the latch lever guiding groove 160h (see FIG. 14 and FIG. 15) of the holder 160. In a state that the ink tank 130 is mounted on the holder 160, the latch lever is pressed by the latch lever guiding groove 160h to bend in the direction indicated by an arrow C in FIG. 17. Therefore, the latch nail 132e formed on the latch lever 132a engages with the latch nail coupling hole 160j formed on the latch lever guiding groove 160h. Here, for the present embodiment, the latch lever 132a is integrally formed with the container 132.

On the upper surface of the lid member 131, a stepped portion 131a is formed on the end portion where the fall-off nail 132d is arranged to make such portion one step lower than the upper surface of the lid member 131. When the ink tank 130 is mounted on the holder 160, the ink tank 130 is inserted, while allowing this stepped portion 131a to get into underneath each of the expanded portions 160f (see FIG. 14 and FIG. 15) of the holder 160 to roughly position the ink tank. Here, a tank extrusion 131b is also formed to fit the tank extrusion guide 160g of the holder 160.

Now, the description will be made of the mounting and demounting operation of the ink tank 130 on and from the holder 160.

Figure 19:
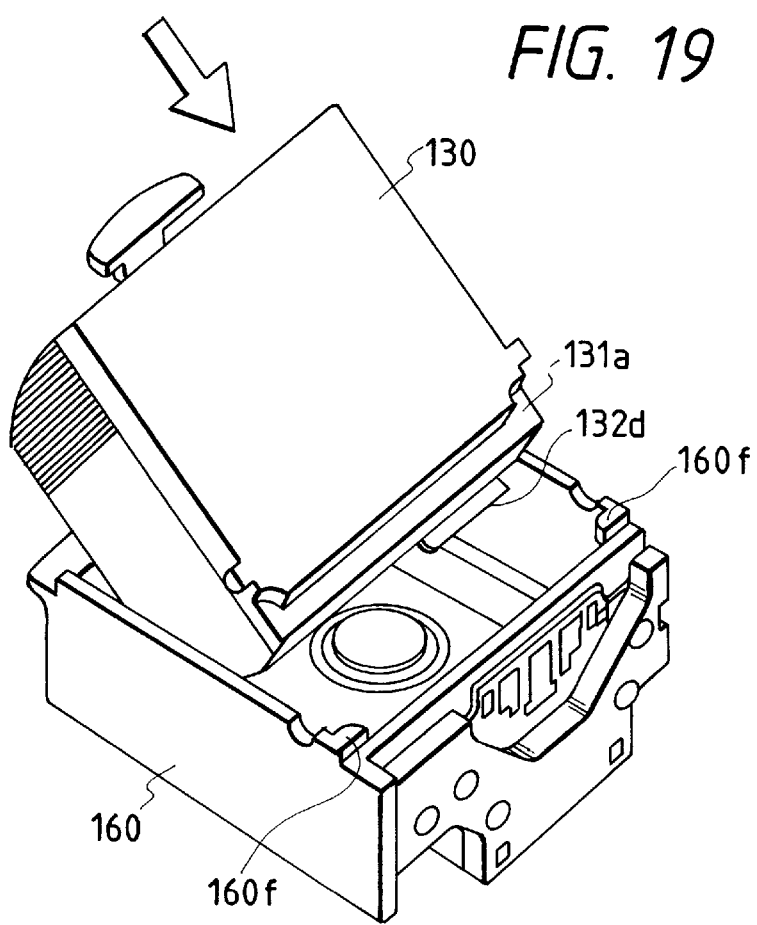
FIG. 19 is a perspective view which shows the first step of the procedure for installing an ink tank on a recording head cartridge.

When the ink tank 130 is mounted on the holder 160, the sealing material that seals the ink supply port 132b is peeled off at first. Then, as shown in FIG. 19, the ink tank 130 is inserted diagonally as indicated by an arrow in FIG. 19 from the side where the fall-off stopper nail is formed. At the same time that the stepped portion 131a of the ink tank 130 is allowed to get into underneath each of the expanded portions 160f, the fall-off stopper nail 132d is hooked onto the tank fall-off stopper hole 160i (see FIG. 15) of the holder 160, thus roughly positioning the ink tank 130. Also, the inclined face 132f is formed on the ink tank 130. Therefore, when the ink tank 130 is inserted into the holder 160, this inclined face 132f is used as a guide. With this face being placed substantially parallel to the bottom wall of the holder 160, the ink tank is inserted, thus making it easier to allow the stepped portion 131a of the ink tank 130 to get into underneath each of the expanded portions 160f of the holder 160. Also, the holder 160 and the ink tank 130 are provided with inclined faces 160K and 132F that face each other. As a result, any other ink tanks having different inclination cannot be mounted. In this way, any erroneous mounting of ink tank is prevented.

Figure 20:
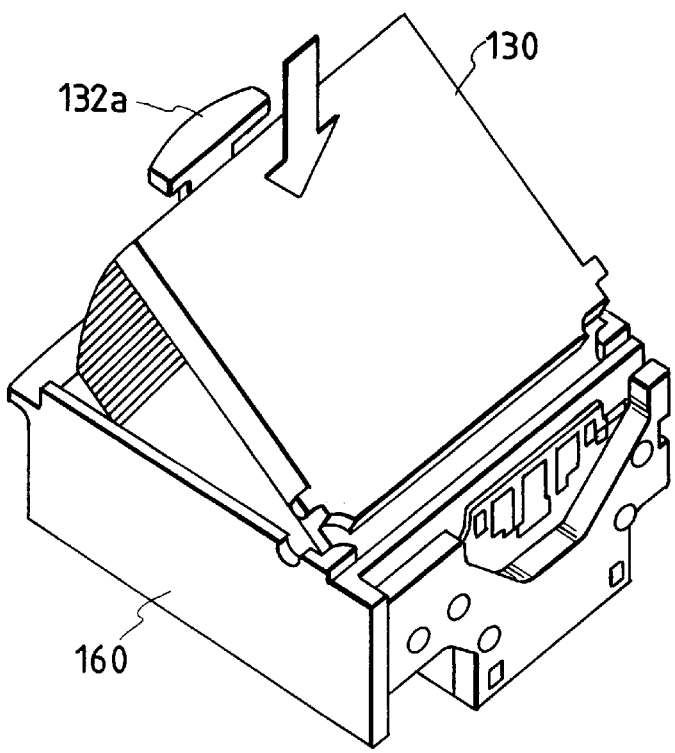
FIG. 20 is a perspective view which shows the second step of the procedure for installing the ink tank on the recording head cartridge.

Now, as shown in FIG. 20, the ink tank 130 is pressed downward so that the latch lever 132a can shift along the latch lever guiding groove 160h (see FIG. 14 and FIG. 15). Then, the ink tank 130 is allowed to almost rotate centering on the portion having been inserted into the holder 160, and the latch lever 132a is pressed in to be bent inwardly by means of the latch lever guiding groove 160h. Thus, the latch nail 132e (see FIG. 17) of the latch lever 132a engages with the latch nail coupling hole 160j (see FIG. 15) of the holder 160. Then, the ink tank 130 is fixed to the holder 160. Also, when the latch nail 132e engages with the latch nail coupling hole 160j, a clicking sense is created to enable a good mounting touch to be obtained.

When the ink tank 130 is removed from the holder 160, the latch lever 132a is pressed inwardly to release the engagement between the latch nail 132e and the latch nail coupling hole 160j. Since the latch lever 132a is elastically supported at its lower end portion, while being inclined upward to the outer side of the ink tank 130, the latch lever tends to restore itself to the state shown in FIG. 17 when the engagement between the latch nail 132e and the latch nail coupling hole 160j is release. Therefore, the inclined face at the foot of the latch lever 132a slides up along the latch lever guiding groove 160h, and then, the ink tank 130 is automatically raised on the latch lever 132a side so as to be diagonally placed. The ink tank 130 can be removed from the holder 160 when the portion thus raised is picked up.

As described above, the ink tank almost rotates to be mounted on or demounted from the holder 160, hence making it possible to execute the mounting and demounting thereof with a small space. Also, at the time of mounting, the stepped portion 131a is allowed to get into under each of the expanded portions 160f of the holder 160, while using the inclined face of the ink tank 130 as a guide. Thus, the direction of the ink tank 130 is regulated when being inserted into the holder 160. Further, with the provision of the tank extrusion 131b on the ink tank 130 and that of the tank extrusion guide 160g on the holder 160, the position of the ink tank 130 is also regulated when being inserted into the holder 160. In this way, the ink tank 130 can rotate centering substantially on the tank extrusion 131b.

Here, the ink tank 130 is mounted on the holder 160 without any intervention with the filter 162 (see FIG. 14 and FIG. 15). There is no possibility that the filter 162 is damaged when the ink tank 130 is mounted. Also, the ink tank 130 rotates to be mounted on or demounted from the holder 160, making it possible to use only a small space for the purpose, and in turn, to attain making an ink jet recording apparatus smaller.

Figure 21:
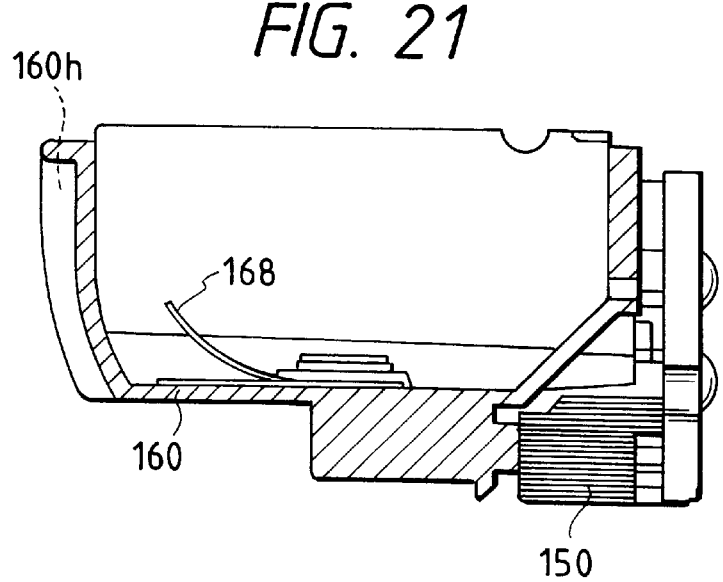
FIG. 21 is a cross-sectional view which shows an example of the recording head cartridge having a pop-up spring on the bottom wall of the holder, corresponding to the recording head cartridge taken along line 21—21 in FIG. 14.

In accordance with the example described above, it is arranged to utilize the phenomenon that the end portion of the ink tank 130 on the latch lever 132a side is raised by the restoring force of the latch lever 132a for removing the ink tank 130 from the holder 160, but in addition to it, there may be arranged a hop-up spring 168 as shown in FIG. 21 as means for biasing the bottom wall of the ink tank 130 on the other end portion (the side where the latch lever 132a is arranged) to the aperture of the holder 160. By utilizing this spring force, the end portion of the ink tank 130 on the latch lever 132a side may be raised. The pop-up spring 168 is a flat spring fixed to the bottom wall of the hollow section of the holder 160, and the free end, which is extended from the holder 160 on the nozzles unit side to the latch lever guiding groove 160h, is bent upward, thus the spring force of the pop-up spring 168 being able to raise the end portion of the ink tank 130 on the latch lever 132a side, and making it possible to increase the degree of its protrusion from the holder 160. This contributes to making the removal of the ink tank easier.

Also, in conjunction with FIG. 19 and FIG. 20, the procedures have been described as to mounting and demounting an ink tank 130 on and from the single body of a recording head cartridge 101, but it is of course possible to mount and demount the ink tank 130 on and from the recording head cartridge 101 that has been mounted on the carriage 40 (see FIG. 8).

Figure 22:
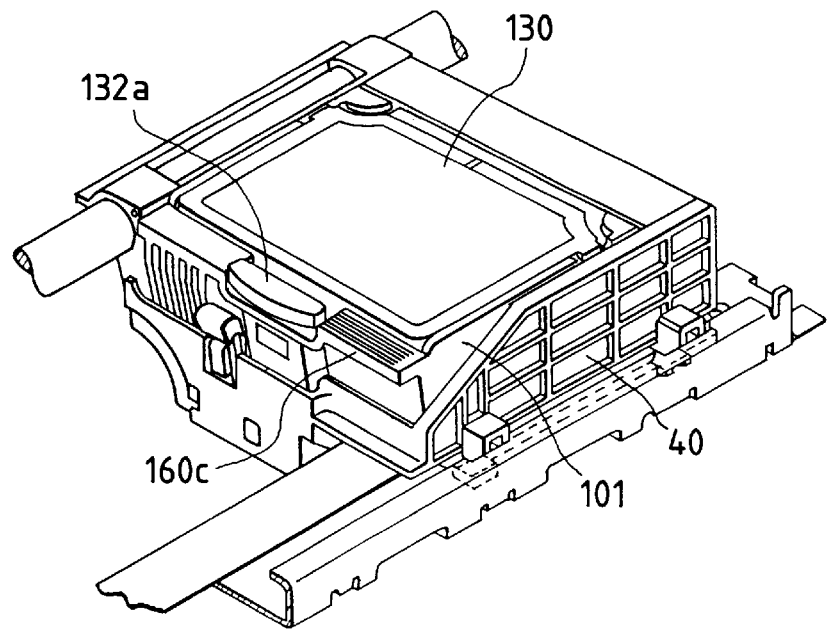
FIG. 22 is a cross-sectional view which shows a state where the recording head cartridge represented in FIG. 11 is mounted on the carriage represented in FIG. 8.

FIG. 22 is a perspective view which shows a state that an ink tank 130 is mounted on a recording head cartridge 101, and then, the recording head cartridge 101 is mounted on the carriage 40. As clear from FIG. 22, the latch lever 132a serving as an operational unit for mounting or demounting the ink tank 130, and the head mounting and demounting operation unit 160c serving as an operational unit for mounting or demounting the recording head cartridge are arranged on one and the same side with respect to the traveling direction of the carriage 40. Therefore, the operator can easily recognize each of the operational units, thus enabling him to unify his operations for the enhancement of the operativity. Further, from the viewpoint of design, it is possible to provide a well-arranged operational units. Moreover, it should be good enough to make a space available for the operator to handle the units only on the side where the latch lever 132a and the head mounting and demounting operation unit 160c are arranged. Therefore, if only the carriage is located accordingly, it becomes possible to mount or demount the ink tank 130 or the recording head cartridge 101 in a position arbitrarily.

Also, the latch lever 132a and the head mounting and demounting operation unit 160c are arranged adjacent to each other, but the removal operation of the ink tank 130 is such as the latch lever 132 being pressed inwardly, whereas the removal operation of the recording head cartridge 101 is such as the head mounting and demounting operation unit 160c being pulled up. With the provision of this difference in the operational methods, it is intended to avoid any erroneous handling of the units. Also, the positions of the latch lever 132a and the head mounting and demounting operation unit 160c are arranged at uneven stages. This also contributes to making it easier to recognize the difference in the functions of the units. In this case, when comparing the mounting and demounting frequency of ink tank 130 and that of recording head cartridge 101, the ink tank 130 is more often mounted or demounted. Therefore, the position of the head (the operator hooks his fingers thereon) of the latch lever 132a is made higher than that of the head mounting and demounting unit 160c for the arrangement of its easier handling.

Figure 23:
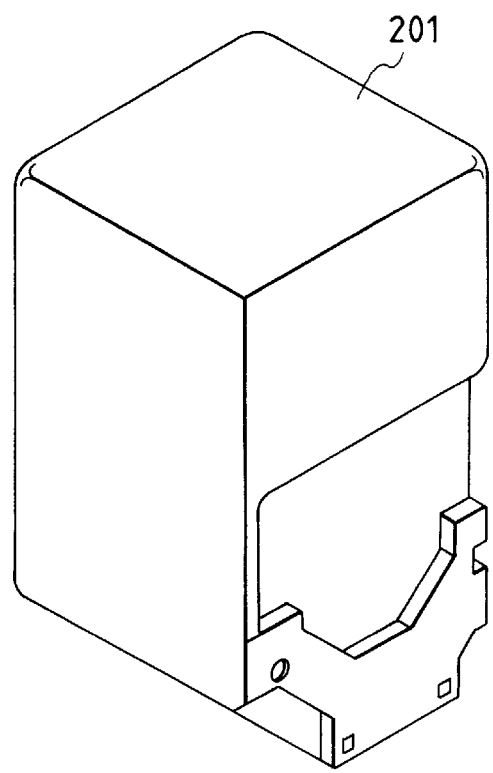
FIG. 23 is a perspective view which shows a recording head cartridge 201 in a mode different from that of the recording head cartridge 101 illustrated in FIG. 8 to FIG. 22.

FIG. 23 is a perspective view which shows a recording head cartridge 201 having a mode different from the recording head cartridge 101 illustrated in FIG. 8 to FIG. 22. The recording head cartridge 201 is capable of retaining a large amount of ink for use of a large recording apparatus.

The scanner head cartridge of the present embodiment shown in FIG. 1 to FIG. 6 is mountable on any one of ink jet printers having difference modes that use the recording head cartridges 101 and 201 described above.

In other words, regarding a small recording head cartridge 101, the scanner head cartridge is made mountable in the same mode as the recording head cartridge 101 on the carriage 40 that can mount the recording head cartridge 101 on it, while regarding a larger recording head cartridge 201, the scanner head cartridge is also made mountable on the carriage that mounts the recording head cartridge 201 by forming it in the same configuration as the recording head cartridge 201 by means of an adapter to be combined therewith, which will be described later.

Before referring to the mounting compatibility of the scanner head cartridge 10, the description will be made of the compatibility of the recording head cartridge 101 at first.

Figure 24:
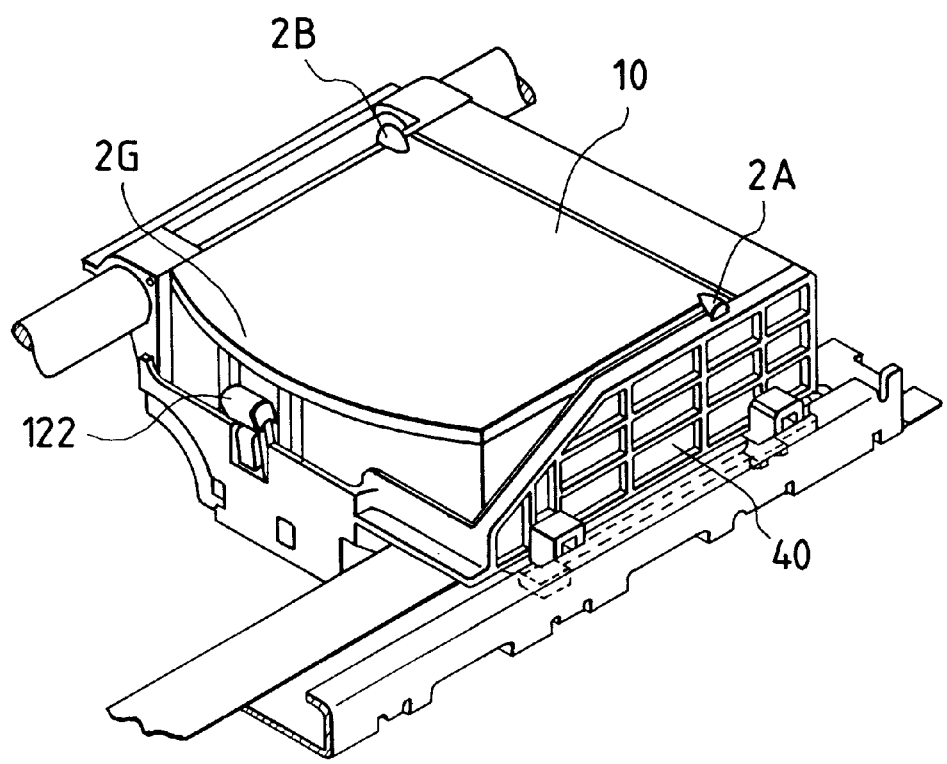
FIG. 24 is a perspective view which shows a state where a scanner head cartridge 10 is mounted on the carriage 40 represented in FIG. 22 in place of the recording head cartridge 101.

FIG. 24 is a perspective view which shows a state where a scanner head cartridge 10 is mounted on the carriage 40 represented in FIG. 22 in place of the recording head cartridge 101.

For the purpose of increasing the ink storage of an ink tank to be mounted in the interior of a recording head cartridge, the recording head cartridge 101 is configured to fit the carriage 40 and to dually function as a guide when it is inserted into the carriage as described earlier.

In case of a scanner head cartridge 10, however, there is a need for it to be in the same configuration as that of the recording head cartridge 201. The shape of the bottom face thereof (the face becoming the same side as a recording sheet) is to be made the same shape as the bottom face of the recording head cartridge 201. When it is inserted into the carriage 40, the ears 2A and 2B serving as positioning guide means are allowed to get along the upper edges of the wall on the carriage 40, and the inserting operation is made easier. The precise positioning at the time of insertion is carried out in the same manner as the recording head cartridge 101 by means of the two head positioning extrusions 40d and 40e, and the positioning hole 1B and the positioning groove 1C.

Now, regarding the state that the scanner head cartridge 10 is mounted as shown in FIG. 24, it is pressed to the contacting point of the head guide 122 to assuredly connect the scanner head cartridge 10 with and mounting it on the carriage 40.

At this juncture, the recessed portion 2E (see FIG. 4) formed on the extrusion 2F protruding from the upper case 2 is the portion that is pressed by the head guide 122. Therefore, the mode is arranged to press the extrusion 2F to the dowel 3D, thus making the fitting between the recess 2D and the dowel 3D more intensive. Then, the integration of the lower case 1 and the upper case 2 is made more reliably. When the scanner head cartridge 10 is removed from the carriage 40, the eaves 2G is pulled up. However, since the extrusion 2F is being pressed by the head guide 122 until the scanner head cartridge 10 is removed from the carriage 40, the removal is carried out in condition that the lower case 1 and the upper case 2 are still integrated. In turn, this makes the operation easier.

Now, with reference to FIGS. 25A and 25B, the description will be made of the structure of an adapter and its installation to provide the same configuration as a recording head cartridge 201.

Figure 25A:
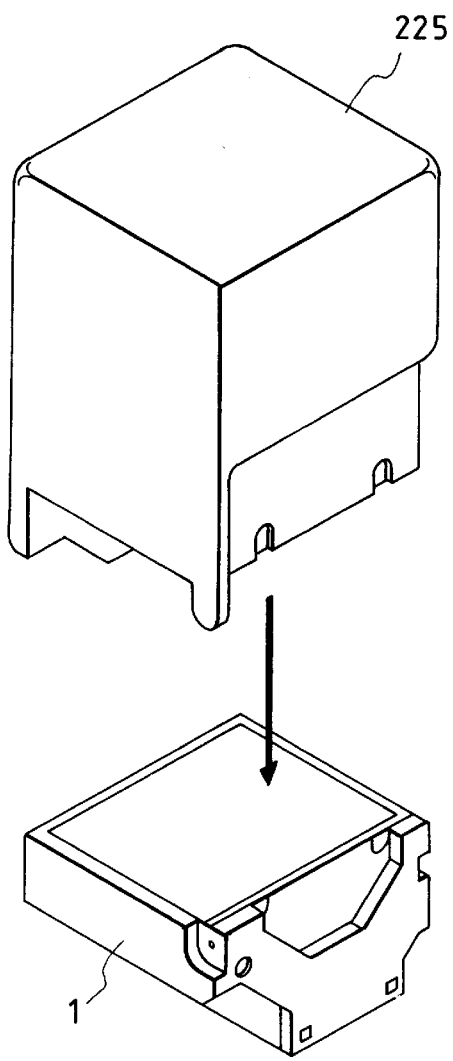
FIGS. 25A and 25B are views which show the structure and the installation state of an adapter to provide the same configuration of the recording head cartridge 201 represented in FIG. 23.
Figure 25B:
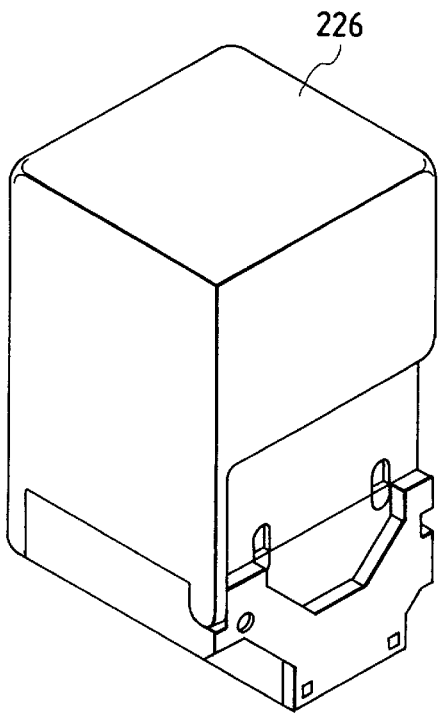

As shown in FIGS. 25A and 25B, the upper case 2 is removed from the scanner head cartridge 10, and only the lower case 2 is used.

The hinge unit (not shown) of an adapter 225 is fitted into the hole 1S for rotation (see FIG. 2) of the lower case 1 as shown in FIG. 25A, and further, the dowel 3D shown in FIG. 3 is fitted into the recess (not shown) in the portion protruding from the edge portion on the side opposite to the hinge unit, and then, the same configuration is formed as the recording head cartridge 201 shown in FIG. 23. In this way, the upper and lower cases are formed integrally to present the scanner head cartridge 226 as shown in FIG. 25B.

Here, it has been described that the coupling mode of the lower case 1 and the adapter 225 is made in the same manner as fitting the lower case 1 and the upper case 2 together, but the present invention is not necessarily limited to such mode. Any other coupling modes may be used without any problem if only the mode thereof does not render any obstacles in mounting a scanner head cartridge on a printer. Therefore, by the application of the adopter method, a scanner head cartridge can be arranged to provide different configurations, hence making it unnecessary to prepare a new head cartridge as a whole. In this way, not only a significant cost reduction is possible, but also, one base unit can be arranged for use of several kinds of printers.

Since the present embodiment is structured as described above, the following effects are obtainable:

When a scanner head cartridge is mounted on a carriage, it is possible to mount the scanner head cartridge smoothly by a simple mounting operation, and to provide a scanner head cartridge capable of being mounted with a highly precise positioning, and also, to provide an information processing apparatus capable of mounting such scanner head cartridge on it.

It is possible to implement a common use even among carriages having different configurations that mount different ink head cartridges by means of a base unit that can be shared by such carriages, and then, to effectively implement a significant cost reduction.

What is claimed is:

1. A scanner head cartridge capable of being held exchangeably with an ink head cartridge on a carriage capable of moving said ink head cartridge of an information processing apparatus for recording on a recording medium, said scanner head cartridge comprising:

a lower case containing therein optical parts required for reading;

an upper case structured to be coupled with said lower case for covering the open face of said lower case; and guiding means arranged on said upper case for positioning when being inserted into said carriage, said guiding means guiding so as to position said scanner head cartridge in a direction that approaches an original medium.

2. A scanner head cartridge according to claim 1, wherein a lower case is coupled with an upper case in the vicinity of one side of the open face of said lower case, and coupling means is arranged on the side opposite to the side of said upper case and said lower case being coupled.

3. A scanner head cartridge according to claim 1, further comprising a coupling means for coupling being structured by a first coupling member protruded from the edge portion of said upper case, and a second coupling member arranged on said lower case corresponding to said first coupling member, and said coupling means is arranged on a position for holding means of a carriage to press said first coupling member to said second coupling member at the time of being mounted on said carriage.

4. A scanner head cartridge according to claim 1, wherein a light source constituting said optical parts contained in said lower case is arranged to enable the illuminating light thereof to irradiate a source document diagonally, and at the same time, to enable the center of irradiation thereof to irradiate a position in the depth direction deeper than the reference position of the height of said source document.

5. A scanner head cartridge according to claim 4, wherein said light source is formed by a plurality of LEDs, and at the same time, a cooling plate is provided for the reverse side of the base board installing said LEDs thereon in order to stabilize the temperature thereof.

6. A scanner head cartridge according to claim 5, wherein low electric current flows for a specific period of time to give preheating before reading, and low electric current flows after reading in order to keep a given temperature.

7. An information processing apparatus for recording on a recording medium said information processing apparatus comprising: a carriage capable of moving along said recording medium, a scanner head cartridge mounted thereon exchangeably with an ink head cartridge for recording on the recording medium, said scanner head cartridge being provided with a lower case containing therein optical parts required for reading, an upper case structured to be coupled with said lower case for covering the open face of said lower case, and guiding means arranged on said upper case for positioning when being inserted into said carriage, said guiding means guiding so as to position said scanner head cartridge in a direction that approaches an original medium.

8. A scanner head cartridge according to claim 7, wherein the lower case is coupled with the upper case in the vicinity of one side of the open face of said lower case, and coupling means is arranged on the side opposite to the side of said upper case and said lower case being coupled.

9. A scanner head cartridge according to claim 7, further comprising a coupling means for coupling being structured by a first coupling member protruded from the edge portion of said upper case, and a second coupling member arranged on said lower case corresponding to said first coupling member, and said coupling means is arranged on a position for holding means of a carriage to press said first coupling member to said second coupling member at the time of being mounted on said carriage.

10. A scanner head cartridge according to claim 7, wherein a light source constituting said optical parts contained in said lower case is arranged to enable the illuminating light thereof to irradiate a source document diagonally, and at the same time, to enable the center of irradiation thereof to irradiate a position in the depth direction deeper than the reference position of the height of said source document.

11. A scanner head cartridge according to claim 10, wherein said light source is formed by a plurality of LEDs, and at the same time, a cooling plate is provided for the reverse side of the base board installing said LEDs thereon in order to stabilize the temperature thereof.

12. A scanner head cartridge according to claim 11, wherein low electric current flows for a specific period of time to give preheating before reading, and low electric current flows after reading in order to keep a given temperature.

13. An information processing apparatus according to claim 7, wherein said ink head cartridge is provided with an ink jet head to discharge ink from the ink discharge ports to record on said recording medium.

14. An information processing apparatus according to claim 7, wherein said ink head cartridge is provided with electrothermal transducing elements, and at the same time, provided with an ink jet head to record on said recording medium by discharging ink from the ink discharge ports by use of thermal energy generated by said electrothermal transducing elements.

15. An information processing apparatus according to claim 7, wherein said ink head cartridge is provided with piezoelectric elements, and at the same time, provided with an ink jet head to record on said recording medium by discharging ink from the ink discharge ports by use of mechanical energy generated by said piezoelectric element.

16. A head member to be mounted upon a carriage of a recording apparatus for recording on a recording medium conveyed along a recording medium conveyance route, said head member being located at a position opposed to the recording medium conveyance route, said head member comprising:
   a lower case;
   an upper case engageable with said lower case to cover said lower case from above; and
   positioning means provided on said upper case to position said head member when said head member is mounted on said carriage, said positioning means positioning said head member in a direction that approaches the recording medium conveyance route.

17. A head member according to claim 16, wherein said lower case is coupled with said upper case in the vicinity of one side of an open face of said lower case, and a coupling means for coupling said lower case and said upper case is arranged on a side opposite to the one side of said upper case and said lower case being coupled.

18. A head member according to claim 16, said head member comprising a coupling means for coupling having a first coupling member protruded from an edge portion of said upper case, and a second coupling member arranged on said lower case corresponding to said first coupling member, and said coupling means is arranged on a position for a holding means for holding of a carriage to press said first coupling member to said second coupling member as being mounted on said carriage.

19. A recording apparatus for recording on a recording medium conveyed along a recording medium conveyance route, said apparatus comprising:
   a carriage moveable along the recording medium, said carriage having a head holding means for holding a head member having a lower case, an upper case engageable with said lower case to cover said lower case from above, said head member being located at a position opposed to the recording medium conveyance route, and positioning means provided on said upper case to position said head member when said head member is mounted on said carriage, said head holding means being engageable with said positioning means, said positioning means positioning said head member in a direction that approaches the recording medium conveyance route.

20. A recording apparatus according to claim 19, wherein said lower case is coupled with said upper case in the vicinity of one side of an open face of said lower case, and a coupling means for coupling said lower case and said upper case is arranged on a side opposite to the one side of said upper case and said lower case being coupled.

21. A recording apparatus according to claim 19, said head member comprising a coupling means for coupling having a first coupling member protruded from an edge portion of said upper case, and a second coupling member arranged on said lower case corresponding to said first coupling member, an said coupling means is arranged on a position for holding means for holding of a carriage to press said first coupling member to said second coupling member as being mounted on said carriage.

22. A head member to be mounted on a carriage of an information processing apparatus having a sheet member conveyance route, said head member being located at a position opposed to the sheet member conveyance route, said head member comprising:

a lower case;

an upper case engageable with said lower case to cover said lower case from above; and positioning means provided on said upper case to position said head member when said head member is mounted on said carriage, said positioning means positioning said head member in a direction that approaches the sheet member conveyance route.

23. A head member according to claim 22, wherein said lower case is coupled with said upper case in a vicinity of a one side of an open face of said lower case, and a coupling means for coupling said lower case and said upper case is arranged on a side opposite to the one side of said upper case and said lower case being coupled.

24. A head member according to claim 22, said head member comprising a coupling means for coupling having a first coupling member protruded from an edge portion of said upper case, and a second coupling member arranged on said lower case corresponding to said first coupling member, and said coupling means is arranged on a position for a holding means for holding of said carriage to press said first coupling member to said second coupling member as being mounted on said carriage.

25. An information processing apparatus having a recording medium conveyance route, comprising:

a carriage moveable along a recording medium, said carriage having a head holding means for holding a head member having a lower case, an upper case engageable with said lower case to cover said lower case from above, said head member being located at a position opposed to the recording medium conveyance route, and positioning means provided on said upper case to position said head member when said head member is mounted on said carriage, said positioning means positioning said head member in a direction that approaches the recording medium conveyance route, said head holding means being engageable with said positioning means.

26. A recording apparatus according to claim 25, wherein said lower case is coupled with said upper case in a vicinity of a one side of an open face of said lower case, and a coupling means for coupling said lower case and said upper case is arranged on a side opposite to the one side of said upper case and said lower case being coupled.

27. A recording apparatus according to claim 25, said recording apparatus comprising a coupling means for coupling having a first coupling member protruded from an edge portion of said upper case, and a second coupling member arranged on said lower case corresponding to said first coupling member, and said coupling means is arranged on a position for holding means for holding of said carriage to press said first coupling member to said second coupling member as being mounted on said carriage.

28. A head member to be held by a head holding member of an information processing apparatus having a recording medium conveyance route at a position opposed to the recording medium conveyance route, said head member comprising:

a first case provided with a containing portion for containing a component for performing information processing and an opening portion for communicating said containing portion with an outside;

a second case engageable with said first case to cover said opening portion of said first case; and positioning means provided on said second case to position said head member when said head member is mounted on said holding member, said positioning means positioning said head member in a direction that approaches the recording medium conveyance route.

29. A head member according to claim 28, wherein said first case is coupled with said second case in a vicinity of one side of an open face of said first case, and a coupling means for coupling said first case and said second case is arranged on a side opposite to the one side of said second case and said first case being coupled.

30. A head member according to claim 28, said head member comprising a coupling means for coupling having a first coupling member protruded from an edge portion of said second case, and a second coupling member arranged on said first case corresponding to said first coupling member, and said coupling means is arranged on a position for a holding means for holding of said holding member to press said first coupling member to said second coupling member as being mounted on said holding member.

31. An information processing apparatus having a sheet member conveyance route, comprising:

a head holding member for holding a head member at a position opposed to a sheet member, said head holding member having head holding means for holding said head member having a first case provided with a containing portion for containing a component for performing information processing and an opening portion for communicating said containing portion with an outside, a second case engageable with said first case to cover said opening portion of said first case, said head member being located at a position opposed to the sheet member conveyance route, and positioning means provided on said second case to position said head member when said head member is mounted on said holding member, said positioning means positioning said head member in a direction that approaches the recording medium conveyance route, said head holding means being engageable with said positioning means.

32. A recording apparatus according to claim 31, wherein said first case is coupled with said second case in the vicinity of one side of an open face of said first case, and a coupling means for coupling said first case and said second case is arranged on a side opposite to the one side of said second case and said first case being coupled.

33. A recording apparatus according to claim 31, said recording apparatus comprising a coupling means for coupling having a first coupling member protruded from an edge portion of said second case, and a second coupling member arranged on said first case corresponding to said first coupling member, and said coupling means is arranged on a position for holding means for holding of said head holding member to press said first coupling member to said second coupling member as being mounted on said head holding member.

34. A scanner head cartridge capable of being held exchangeably with an ink head cartridge on a carriage capable of moving said ink head cartridge of an information processing apparatus for recording on a recording medium, said scanner head cartridge comprising:

a lower case containing therein optical parts required for reading, the optical parts comprising a light source contained in said upper case and arranged to enable the illuminating light thereof to irradiate a source document diagonally, and at the same time, to enable the center of irradiation thereof to irradiate a position in the depth direction deeper than the reference position of the height of said source document;

an upper case structured to be coupled with said lower case for covering the open face of said lower case; and guiding means arranged on said upper case for positioning when being inserted into said carriage.

35. An information processing apparatus for recording on a recording medium said information processing apparatus comprising: a carriage capable of moving along said recording medium, a scanner head cartridge mounted thereon exchangeably with an ink head cartridge for recording on the recording medium, said scanner head cartridge being provided with a lower case containing therein optical parts required for reading, the optical parts comprising a light source arranged to enable the illuminating light thereof to irradiate a source document diagonally, and at the same time, to enable the center of irradiation thereof to irradiate a position in the depth direction deeper than the reference position of the height of said source document, an upper case structured to be coupled with said lower case for covering the open face of said lower case, and guiding means arranged on said upper case for positioning when being inserted into said carriage.

* * * * *